US012555207B2

(12) United States Patent
Nasrabadi et al.

(10) Patent No.: US 12,555,207 B2
(45) Date of Patent: Feb. 17, 2026

(54) FINGERPHOTO DEBLURRING USING DEEP LEARNING GAN ARCHITECTURES

(71) Applicant: West Virginia University Board of Governors on Behalf of West Virginia University, Morgantown, WV (US)

(72) Inventors: Nasser M. Nasrabadi, Morgantown, WV (US); Jeremy M. Dawson, Fairmont, WV (US); Amol Joshi, Morgantown, WV (US); Ali Dabouei, Morgantown, WV (US)

(73) Assignee: WEST VIRGINIA UNIVERSITY BOARD OF GOVERNORS ON BEHALF OF WEST VIRGINIA UNIVERSITY, Morgantown, WV (US)

( * ) Notice: Subject to any disclaimer, the term of this patent is extended or adjusted under 35 U.S.C. 154(b) by 322 days.

(21) Appl. No.: 18/112,701

(22) Filed: Feb. 22, 2023

(65) Prior Publication Data

US 2023/0281762 A1 Sep. 7, 2023

Related U.S. Application Data

(60) Provisional application No. 63/312,719, filed on Feb. 22, 2022.

(51) Int. Cl.
*G06K 9/00* (2022.01)
*G06T 3/4046* (2024.01)
*G06T 5/73* (2024.01)

(52) U.S. Cl.
CPC .............. *G06T 5/73* (2024.01); *G06T 3/4046* (2013.01); *G06T 2207/20016* (2013.01)

(58) Field of Classification Search
CPC ......... G06T 3/4046; G06T 5/73; G06T 5/003; G06T 5/70; G06T 2207/20016;
(Continued)

(56) References Cited

U.S. PATENT DOCUMENTS 11,488,288 B1 * 11/2022 Heo ..................... G06V 10/82
2021/0049743 A1 * 2/2021 Litwiller ................ G06N 3/084

FOREIGN PATENT DOCUMENTS

WO  WO-2018031900 A1 * 2/2018 ......... G06K 9/00033

OTHER PUBLICATIONS

Kupyn, O., Martyniuk, T., Wu, J., & Wang, Z. (2019). Deblurgan-v2: Deblurring (orders-of-magnitude) faster and better. In Proceedings of the IEEE/CVF international conference on computer vision (pp. 8878-8887). (Year: 2019).*

(Continued)

*Primary Examiner* — Gregory A Morse
*Assistant Examiner* — Kevin M Coomber
(74) *Attorney, Agent, or Firm* — Thomas | Horstemeyer, LLP

(57) ABSTRACT

Various examples are provided related to fingerphoto deblurring. In one example, a method includes generating, using a guided-attention (GA) mechanism, an intermediate feature map of a blurred image of a fingerprint and generating a deblurred image of the fingerprint based at least in part upon the intermediate feature map. The GA mechanism can generate the intermediate feature map by generating an attended feature map from an input feature map based upon a predicted attention map and adding the input feature map to the attended feature map. A system can include processing circuitry and a fingerphoto deblurring application that, when executed by the processing circuitry, causes the processing circuitry to generate the intermediate feature map and generate the deblurred image.

18 Claims, 17 Drawing Sheets

(58) Field of Classification Search
CPC .......... G06T 2207/20012; G06V 10/82; G06V 40/1347; G06V 40/10; G06V 40/1365; G06V 40/12; G06V 10/776; G06V 10/774; G06F 18/253
See application file for complete search history.

(56) References Cited

OTHER PUBLICATIONS

Yan, R., & Shao, L. (2016). Blind image blur estimation via deep learning. IEEE Transactions on Image Processing, 25(4), 1910-1921. (Year: 2016).*

Cho, N. S., Kim, C. S., Park, C., & Park, K. R. (2020). GAN-based blur restoration for finger wrinkle biometrics system. IEEE Access, 8, 49857-49872. (Year: 2020).*

Song, C. H., Han, H. J., & Avrithis, Y. (2021). All the attention you need: Global-local, spatial-channel attention for image retrieval. arXiv preprint arXiv:2107.08000. (Year: 2021).*

O. Kupynl, V. Budzan, M. Mykhailych, D. Mishkin and J. Matas, "DeblurGAN: Blind Motion Deblurring Using Conditional Adversarial Networks," CVPR May 2018.

N. S. Cho , C. S. Kim , C. Park , and K. R. Park, "GAN-Based Blur Restoration for Finger Wrinkle Biometrics System,"IEEE Access, Mar. 2020.

Z. Fu, T. Ma, Y. Zheng, H. Ye, J. Yang and L. He, "Edge-Aware Deep Image Deblurring," arXivpreprint arXiv:1907.02282, Jul. 2019.

* cited by examiner (c) PolyU

FINGERPHOTO DEBLURRING USING DEEP LEARNING GAN ARCHITECTURES

CROSS REFERENCE TO RELATED APPLICATIONS

This application claims priority to, and the benefit of, U.S. provisional application entitled "Fingerphoto Deblurring Using Deep Learning GAN Architectures" having Ser. No. 63/312,719, filed Feb. 22, 2022, which is hereby incorporated by reference in its entirety.

STATEMENT REGARDING FEDERALLY SPONSORED RESEARCH OR DEVELOPMENT

This invention was made with government support awarded under CNS1650474 awarded by the National Science Foundation. The Government has certain rights in the invention.

BACKGROUND

Fingerprint identification is a biometric technology used for the authentication and identification of individuals. The technology identifies ridge and valley patterns on the finger, as these biometric characteristics are unique to the individual user. Fingerprint identification is deployed in large-scale touch-based recognition systems not only for law enforcement and forensic agencies but also in smartphones, tablets, computers, and a plethora of other applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
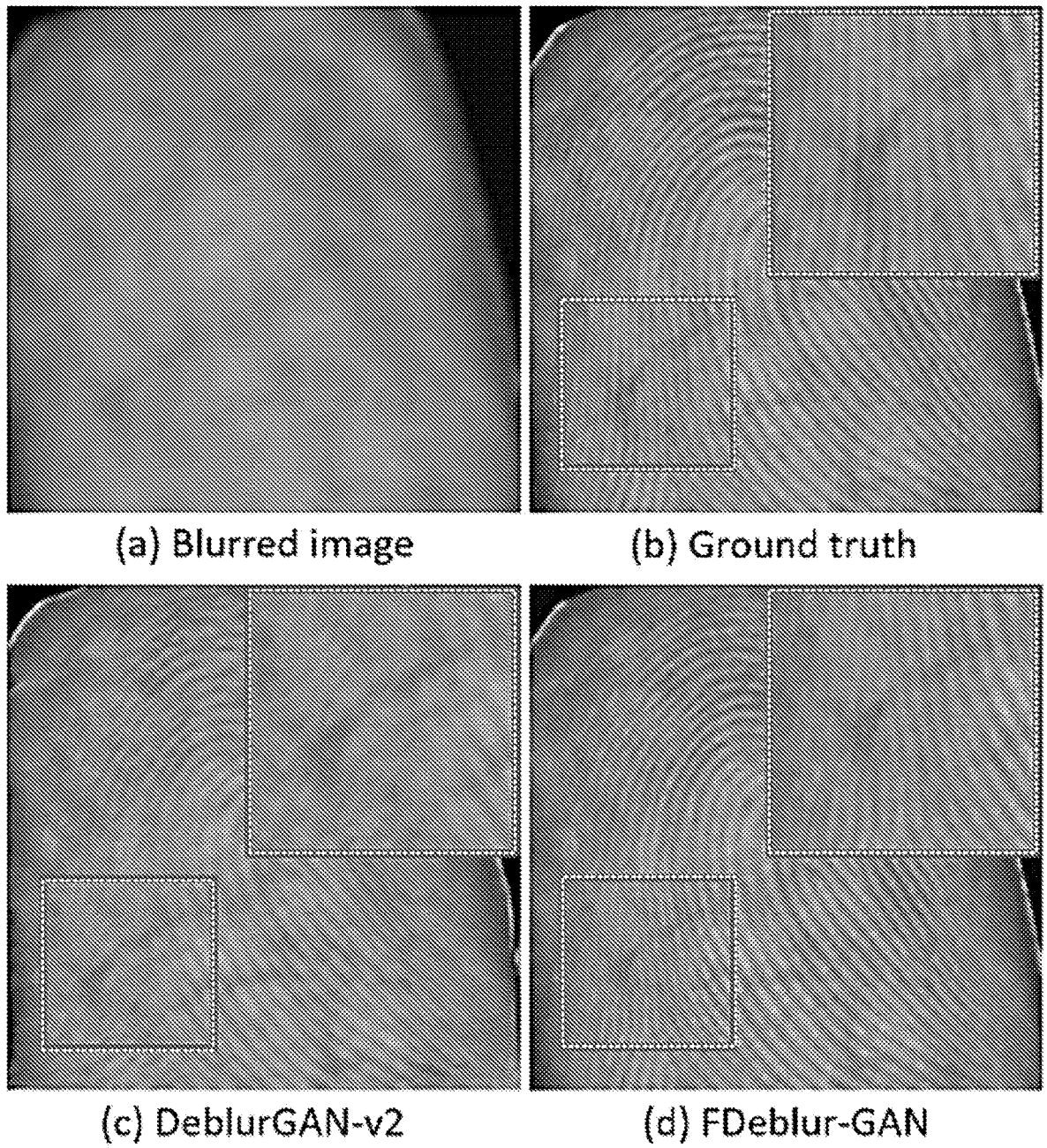
FIG. 1 illustrates an example of a sample result of deblurring using the proposed FDeblur-GAN methodology and a state-of-the-art method, in accordance with various embodiments of the present disclosure.

Disclosed herein are various examples related to fingerphoto deblurring. Reference will now be made in detail to the description of the embodiments as illustrated in the drawings, wherein like reference numbers indicate like parts throughout the several views.

Identifying humans with unique biometric features is a great advantage to security and identification tasks. It offers immense benefits in cases such as crime-solving, evidence collection, and human verification and authorization. Recent advances in deep learning have demonstrated promising performance in biometric identification. A deep model has been proposed to learn the descriptive iris features for iris recognition. A deep learning approach can be used to learn the face representation and alignment such that a simple classifier would be able to recognize the face ID. Even though several alternative biometric systems are adopted in the real world, traits, like the iris or the face, have their own limitations. For instance, the iris acquisition requires expensive devices whereas, the face is prone to manipulations or changes in the appearance.

Compared to other biometric traits, fingerprints have several advantages. First of all, fingerprints of every individual are unique. This makes fingerprints one of the safest biometric modalities. In crime scene investigations, fingerprint traces are helpful to find a suspect. The ease of collection of fingerprints using cheap capturing methods such as mobile cameras, ink, sensors, etc., is a unique feature in fingerprint biometrics. Based on the collection techniques, the fingerprint samples can be divided into contact-based, i.e., collected using a sensor that requires a direct contact, or contact-less, such as captured with a digital camera or a smartphone. Not only is fingerphoto (contact-less fingerprint) acquisition hygienically safe and much quicker than the other collection techniques, but due to the robust commercial fingerphoto recognition systems, the fingerphotos are also easy to recognize and verify. Hence, under many circumstances where a quick and reliable verification is needed, fingerphotos are certainly ideal. These include cases like on-the-go quick person recognition, latent fingerphotos from a crime scene, ID information retrieval from legacy multi-modal databases, etc.

However, fingerphotos acquired from crime scenes or samples captured by the law enforcement agents using the camera of a smartphone may not be as good as contact-based. The photometric distortion often deteriorates the quality of fingerphotos. It is mainly caused by the non-ideal conditions of the capturing device such as, e.g., out-of-focus lens, perspective distortion, dirt, or moisture on the skin, etc. Blurring is a common type of photometric distortion that can be caused by several factors such as human errors, trembling fingers, a slow frame rate of the capturing sensor, inappropriate focusing of the camera, or intentional blurring by malicious users to evade being identified, etc. Recognition of such blurred samples is a cumbersome task which even state-of-the-art systems may fail to accomplish. Therefore, deblurring is an ineluctable step in the recognition of blurred fingerphotos.

Ever since the emergence of the generative adversarial networks (GAN), generative tasks like image restoration and translation have become far more efficient and reliable. With the advent of different approaches and recent developments, the GAN training has become stable enough to produce realistic images under some conditional settings. Hence, conditional GAN (cGAN) models can be used as the principal approach for image restoration tasks, such as image deblurring, partial image reconstruction, or natural image denoising and inpainting. A deep convolutional neural network (CNN) has been developed to remove the motion blur for better object detection. However, the method does not consider other blurring kernels like Gaussian, defocusing, etc., that may affect the object detection performance. Edge heuristics and a GAN model have been used to remove the non-uniform blurring from dynamic scenes. This model deblurs the images precisely, but its performance may plunge if there are no visible edges in the blurred image. A mathematical model-based technique has been proposed to deblur Gaussian or motion blur. This method does not require huge amounts of blurred images to train and can still produce state-of-the-art deblurred images. But, due to the abnormal randomness in blurring kernels of real-world blurred images, this method may not be as effective.

To address the blurring problem in fingerphotos using a deep deblurring model, this problem can be treated as a domain translation task where the source and target domains are the blurred and clear fingerphotos, respectively. A deep model was developed to learn the inverse mapping between the two domains given a large dataset of synthetically blurred fingerphoto samples with multiple types of blurring kernels such as Gaussian, motion, and defocusing. The deep convolutional neural network model, FDeblur-GAN, accepts a blurred fingerphoto and returns the deblurred fingerphoto. A cGAN architecture can be used as the base model for the deblurring task and its functionality can be enhanced by considering four modifications to the cGAN architecture.

In the first modification, the intermediate features can be extracted from different layers of the generator and fed to their corresponding discriminators, which allows the generator to capture ridge information at different scales from coarse ridge patterns to fine ridge details. In the second modification, a deep fingerphoto verifier can be used to force the generator model to preserve the ID of the deblurred fingerphotos during the deblurring process. Contrary to other image deblurring tasks, in fingerphoto deblurring, the ridges encompass unique structure and properties that represent the fingerphoto identity (ID) information. The deblurring process may alter this information by adding redundant ridge-valley patterns and removing critical minutiae. Hence, a pre-trained deep fingerphoto verifier can be used as an additional loss term to ensure the generator is preserving the fingerphoto's ID information while deblurring fingerphotos.

In the third modification, a guided-attention block or mechanism can be used to force the network to pay attention to the partially blurred regions in the fingerphotos. This way the trained network is agnostic to blurred and sharp region imbalance in defocused images. Lastly, a multi-task learning approach can be introduced to effectively augment the training supervision and help the model to specialize on different types of blurring. To this aim, an additional task was designed. All the auxiliary modules, the discriminators, and the verifier can work simultaneously to enhance the deblurring process. FIG. 1 illustrates an example of a sample result of deblurring using the proposed FDeblur-GAN model and a state-of-the-art method DeblurGAN-v2 ("DeblurGAN-v2: Deblurring (orders-of-magnitude) faster and better" by O. Kupyn, et al. (2019 IEEE/CVF International Conference on Computer Vision (ICCV), 2019, pp. 8877-8886)). Image (a) is a blurred sample; image (b) is the corresponding ground truth fingerphoto; image (c) is the deblurred fringerphoto from DeblurGAN-v2; and image (d) is the deblurred fingerphoto by FDeblur-GAN. The highlighted regions show the superiority of the disclosed methodology in ridge reconstruction during deblurring.

Contributions of the FDeblur-GAN model can include, but are not limited to:
  a deep multi-task multi-stage generative model is developed to address the challenging but less explored issue of ridge blurring in fingerphotos;
  a deep fingerphoto verifier can be incorporated to force the generator to preserve the ID and ridge information of fingerphotos during the deblurring process;
  the performance of deblurring can be further enhanced by designing a multi-stage generative process based on a coarse-to-fine supervision; and
  guided-attention and multi-task learning approaches can be used to additionally increase robustness of the model towards the non-uniform and partial blurring with complex blurring kernels.

The proposed methodology will be illustrated, and experimental results and an extensive ablation study presented. Fingerphoto data acquisition and preprocessing will be reviewed and advances in image deblurring, including methods utilizing deep learning, discussed. Techniques that can improve the performance of the proposed deblurring model, including multi-task learning, attention mechanism and an approach to preserve the identification information during the generation process, are presented.

Fingerphoto data acquisition and preprocessing. Automated fingerphoto identification systems include data acquisition, preprocessing, and matching. Multiple techniques have been developed for fingerphoto acquisition. Compared to the expensive data collection sensors, digital cameras are cheaper and are available anytime since they are embedded in the smartphones. Due to this portability, it has drawn notable attention in biometrics. Smartphone cameras can be used to capture the fingerphotos or digital cameras can be used to acquire the fingerphotos. Data acquisition and quality assurance methods have been explored to get a reliable fingerphoto recognition system using an edge density metric based on sharpness of the captured image.

Samples collected from contactless sensors or smartphone cameras often suffer from degradation such as low ridge-valley contrast and perspective distortion. Several preprocessing algorithms have been developed to enhance the quality of the fingerphotos. A preprocessing algorithm has been proposed for finger images captured using a mobile camera. The proposed method involves segmentation and orientation estimation of the image. The preprocessing techniques usually involve enhancing the ridge patterns and correcting the perspective distortion.

The last step in identification systems includes the feature extraction and matching of fingerphotos. The performance of algorithms for feature extraction and matching depends highly on the quality of the input samples. Many studies have been conducted to improve feature extraction, including several touchless recognition technologies and non-idealities such as blur, defocusing, noise, and perspective distortion that arise during fingerphoto acquisition. However, the previous methods do not address the problem of motion blur or defocusing issues that affect the fingerphoto recognition performance.

Image Deblurring. While working with low-quality fingerphotos, such as blurred or distorted images, an additional preprocessing step, such as deblurring, can be included. Numerous deep learning algorithms and techniques can be used to undertake image deblurring, however these techniques have been implemented on natural images or other biometric modalities such as the face. The fingerphoto deblurring problem has not been addressed.

Based on prior information about the blurring kernel, deblurring can be classified into two types: blind and non-blind. In blind deblurring the kernel of the blurring effect is unknown. Therefore, algorithms can estimate the blurring kernel and remove the blur from the image. Approaches without the kernel estimation use image information and learn to deblur the images. On the other hand, in non-blind deblurring the blurring kernel is known. One of the techniques in non-blind deblurring is to use statistical information of the blurring kernel to deblur the image. Several attempts have been made to deblur images with different causes of blurring, such as motion blur, Gaussian blur, defocusing, etc. For instance, a feature pyramid network can be used as a generator with a GAN-based learning model to remove motion blur from natural images. Using a double scale discriminator and light-weight backbones, deblurring accuracy and efficiency can be improved. A coarse-to-fine strategy can be used such that, at every scale, a sharp latent image is produced.

Previous methods for deblurring of biometric images were mostly focused on other biometric traits such as iris, face and hand-based biometric traits such as palm prints or finger wrinkles. Cho et al. proposed a GAN-based model for deblurring finger wrinkles for authentication. Despite the potential usefulness of contactless fingerprint recognition, fingerphoto deblurring has not received sufficient attention. Even though deep image deblurring models achieve much higher accuracy, a deblurred fingerphoto needs ID preservation to be matched with the ground truth fingerphoto.

Preserving ID Information. Although generative models like GANs are useful in synthesizing samples from a given dataset, it may be necessary to preserve the semantic information of the input images. Specifically, in the case of biometric data, the identity information is important for further identification process. Algorithms have been proposed to preserve the ID information during generative process. Algorithms based on natural image generation use some distance measure to minimize the distance between the synthetic and real image. To further improve the performance on ID-specific data, algorithms can minimize the distance between the embedding of the real and generated images. In order to achieve this, the L2 norm distance can be used on the features extracted from some pre-trained network which is trained on the data of corresponding domain. Cross-entropy based identity loss can be used to preserve the ID during image generation. Manipulations in the GAN architecture have been proposed along with a combination of some distance measure to preserve the identity better.

Multi-Task Learning. Multi-task learning has demonstrated its significance in several deep learning applications such as classification, restoration and translation, etc. A multi-task learning based approach can be used for face detection, landmark localization, pose estimation, and gender recognition. The feature fusion and learning inter-related tasks can help the network to generalize better on each individual task. Multi-task learning can be used for semantic segmentation tasks and simultaneously improved object detection accuracy. Multi-task learning can also be used for deblurring tasks, where the algorithm can learn to deblur the image and generate a motion field, simultaneously. The significant improvement in deblurring performance shows its effectiveness in removing motion blur from dynamic scenes.

Attention Mechanism. After great achievements in natural language processing, the attention mechanisms have demonstrated their usefulness in computer vision field. The phenomenal benefits of visual attention in deep neural networks have been shown. Recurrent neural network and LSTM based attention mechanisms can be used to generate image caption. A network was proposed to generate images from a given text. The attention mechanism can be applied on multiple scales throughout the generator of the GAN model to get a fine-grained image reconstruction. Attention can also be used in domain translation tasks such as image deblurring. Self-attention can be used on a patch-hierarchical architecture to remove motion blurring in dynamic scenes. Human-aware attention which uses a supervised method to incorporate human awareness to the attention map has also been proposed.

FDeblur-GAN Methodology

Next, a FDeblur-GAN framework comprising a cGAN deblurring network with auxiliary sub-networks arranged together to perform accurate deblurring of fingerphotos is described. First, the conditional GAN is described, then a multi-stage deblurring scheme followed by the ID preservation technique, guided-attention mechanism or block, and multi-task learning approach is discussed. Last, the overall objective function and the proposed network architecture is presented. The following notations are followed in the equations and drawings: bold lower case letters denote vectors; upper case letters denote functions whereas, calligraphic upper case letters represent sets.

Figure 2:
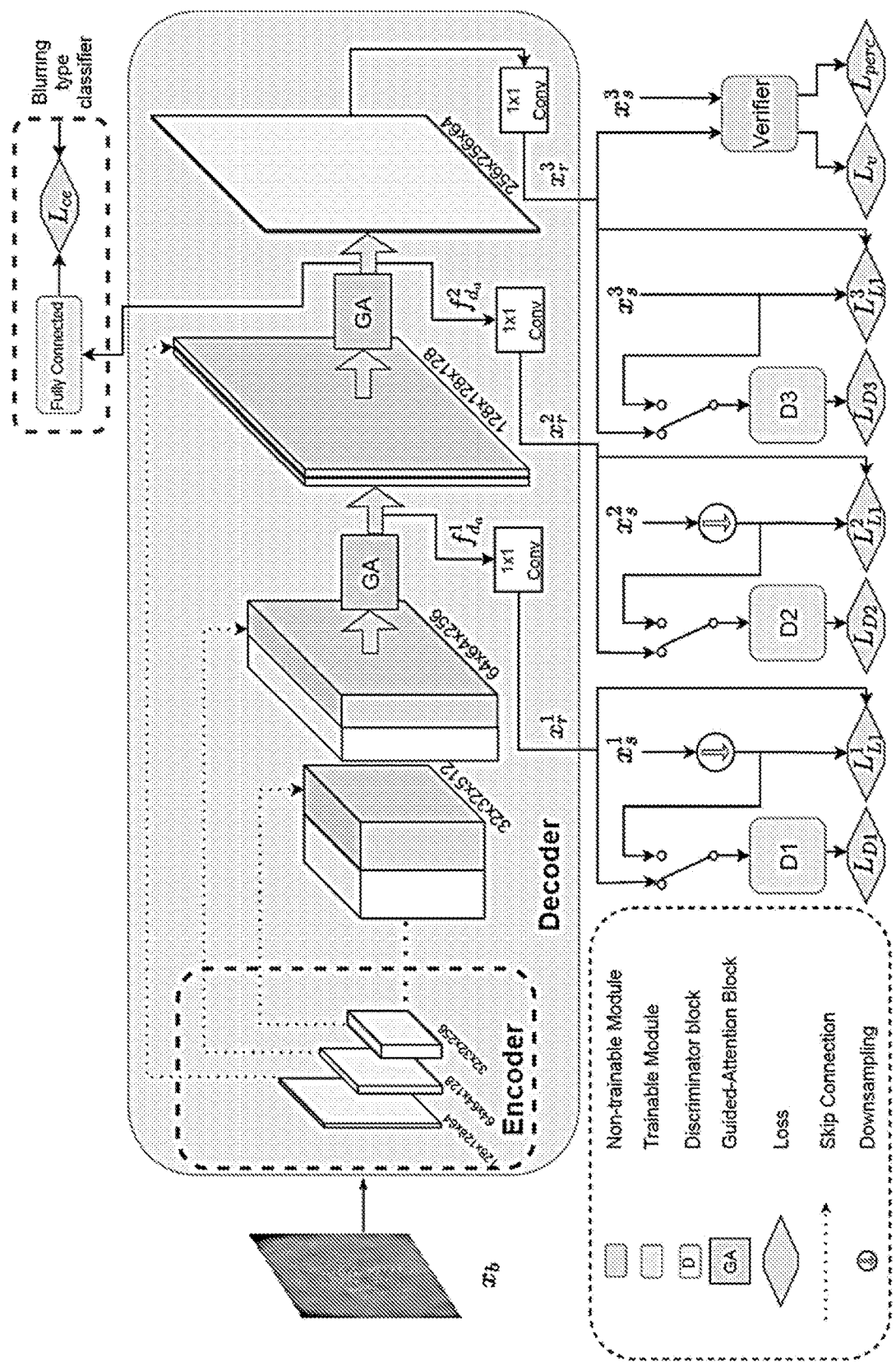
FIG. 2 illustrates an example of an architecture of the proposed FDeblur-GAN methodology, in accordance with various embodiments of the present disclosure.

FIG. 2 illustrates an example of an architecture of the proposed FDeblur-GAN methodology. Input to the generator is a blurred image $x_b$ (e.g., a 256×256 image) and intermediate outputs include $x_r^1$ (e.g., 64×64) and $x_r^2$ (e.g., 128×128). Output of the generator is a deblurred image $x_r^3$ (e.g., a 256×256 deblurred image). Each intermediate feature along-with the last output have separate discriminators D1, D2, and D3, respectively. Feature maps $f_{d_a}^1$ and $f_{d_a}^2$ are obtained from a guided-attention (GA) block or mechanism where $f_{d_a}^2$ can be used to predict the blurring type by a classifier. During the training, $x_s^1$, $x_s^2$, and $x_s^3$ can be used as the ground truth fingerphotos at resolutions of, e.g., 64×64, 128×128, and 256×256, respectively.

Conditional GAN (cGAN). When it comes to cross-domain transformation, GAN models are the most popular generative networks. The original GAN maps the input sample z from a known random distribution $p_x(\mathcal{Z})$ to the target domain such that $y=G(z, \theta_g)$: $z \to y$, where $\theta_g$ represents the trained parameters of the network. GANs generally comprise two networks: a generator G and a discriminator D. The role of the generator is to produce accurate images of the target domain, whereas the discriminator distinguishes between the generated sample and the corresponding real sample. The feedback from the discriminator acts as an adaptive loss to guide the generator to do better in the transformation. In a nutshell, there is a min-max game going on between generator G and discriminator D. The objective function for a GAN can be as follows:

$$O_{GAN}(G, D) = \mathbb{E}_{y \sim \mathcal{P}_{data}(y)}[\log D(y)] + \mathbb{E}_{z \sim \mathcal{P}_{z(z)}}[\log(1 - D(G(z)))], \quad (1)$$

where given the ground truth as y, the generator G, tries to minimize the optimization objective function and the discriminator, D, maximizes it.

The GAN model can be modified to train it in a constrained manner. In conventional GANs, the input to the generator is from a predefined random distribution. Hence, the generator learns a mapping between the simple distribution and the unknown distribution of the target domain from which a set of training images are given. For cross-domain image translation, samples x from the source domain are added as the input to the network. The discriminator is also conditioned with the concatenated input of the target domain and the generated sample. After the modifications, the adversarial objective function becomes:

$$O_{cGAN}(G, D) = \mathbb{E}_{x \sim \mathcal{P}_{data}}[\log D(x, y)] + \mathbb{E}_{x \sim \mathcal{P}_{data}}[\log(1 - D(x, G(x)))]. \quad (2)$$

An additional L2 or L1 loss term can be added to the objective function to calculate the error between the input and output such that it penalizes the generator for creating dissimilar outputs. The final optimization objective of the generative model is as follows:

$$G_{optimal} = \min_G \max_D O_{cGAN}(G, D) + \lambda L_{L1}(y, G), \quad (3)$$

where $\lambda$ is the Lagrangian coefficient to control the relative strength of the reconstruction loss and y is the ground truth fingerphoto. The L1 distance is given by:

$$L_{L1}(y,G)=\|y-G(z)\|_1. \quad (4)$$

Multi-stage Deblurring. Inspired by the multi-scale discriminator approach, an additional modification to the cGAN model can be developed. A multi-stage scheme can be introduced to the deblurring network to leverage the underlying low-level information at different resolutions and avoid erroneous fingerphoto reconstruction. Fingerphotos naturally contain features at different scales (level-1 to level-3 features). Therefore, analyzing the quality of generated fingerphotos at different stages has the potential to provide more valuable information for training the network. To this aim, in addition to the final output of the generator G that has the spatial size of 256×256, the intermediate feature maps from different layers of the decoder of the generator can be extracted with spatial sizes 64×64 and 128×128 and forced to reconstruct the deblurred fingerphotos. Then each of the three outputs at the different resolutions can be passed to a dedicated discriminator to produce the adversarial loss. In this way, a multi-adversarial game is created between the generator G and three different discriminators D1, D2, and D3 as illustrated in FIG. 2.

This multi-stage adversarial scheme provides additional supervision for the training of the generator by using multi-scale features and corresponding ground truth images. Note that the supervision for the intermediate stages can be conveniently obtained by down-sampling the ground truth target fingerphotos. The intermediate layers convey features that represent the deblurred fingerphotos at lower resolutions and the multi-stage approach allows the model to exploit this information and enhance the deblurring even at early stages. Hence, the generator is guided more accurately towards estimating the deblurred fingerphoto. To construct an image from the intermediate feature maps, a 1×1 convolution that encompasses the depth information of feature maps can be used to estimate the fingerphoto image. Afterward, the deblurred images can be compared against the down-sampled version of the ground truth fingerphotos. Given a blurred input fingerphoto $x_b$, the generator G of FIG. 2 reconstructs three deblurred fingerphotos $x_r^1$, $x_r^2$, and $x_r^3$ at, e.g., resolutions 64×64, 128×128, and 256×256, respectively. Further, the sharp ground truth fingerphoto is down-sampled to 64×64 and 128×128, given by $x_s^1$ and $x_s^2$. The original ground truth $x_s^3$ has the resolution of 256×256, therefore it can be used without any down-sampling. The L1 reconstruction loss can be applied on all the three of them to directly supervise the generation process. The modified objective function for training the model can be given by:

$$O_{cGAN}(G, D_1, D_2, D_3) = \quad (5)$$
$$\mathbb{E}_{x_s \sim \mathcal{P}_{data}}\left[\log\left(D_1(x_b^1, x_s^1)\right) + \log\left(D_2(x_b^2, x_s^2)\right) + \log\left(D_3(x_b^3, x_s^3)\right)\right] +$$
$$\mathbb{E}_{x_s \sim \mathcal{P}_{data}}\left[\log\left(1 - D_1(x_b^1, x_r^1)\right) +\right.$$
$$\left.\log\left(1 - D_2(x_b^2, x_r^2)\right) + \log\left(1 - D_3(x_b^3, x_r^3)\right)\right],$$

where $\{x_b^1, x_b^2, x_b^3\}$ are the blurred input fingerphotos at resolution 64×64, 128×128, and 256×256, respectively. As given in the Eq. 2, the conditional GAN uses the input image to add a condition on the discriminator. In this case, these blurred fingerphotos work as the condition on the corresponding discriminator and therefore each discriminator observes the blurred fingerphoto concatenated with the deblurred version and the blurred fingerphoto concatenated with the ground truth.

Figure 3:
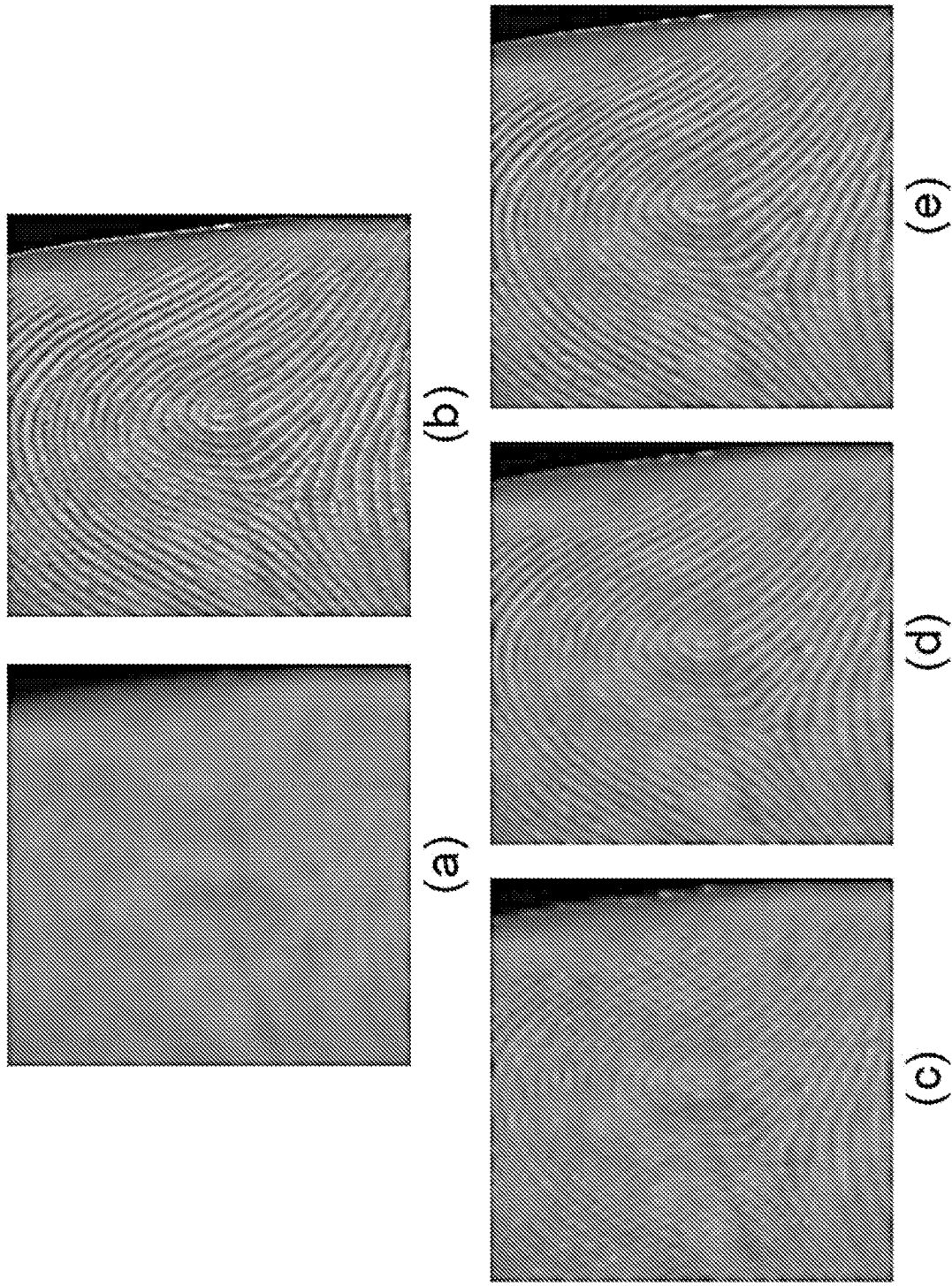
FIG. 3 illustrates examples of a blurred input fingerphoto, ground truth fingerphoto, the deblurred fingerphotos, and the deblurred output, in accordance with various embodiments of the present disclosure.

For the task of deblurring, the training data for source and target domains is available or can be generated synthetically. Therefore, the above model was used as the core network of the deblurring model. It accepts blurred fingerphotos and maps them to its corresponding deblurred image. FIG. 3 shows examples of a blurred input fingerphoto, ground truth fingerphoto, and the deblurred fingerphotos at different intermediate resolutions and the deblurred output. In FIG. 3, image (a) shows the blurred input fingerphoto; image (b) shows the ground truth fingerphoto; image (c) shows the first intermediate deblurred output of size 64×64; image (d) shows the second intermediate deblurred output of size 128×128; and image (e) shows the deblurred output of size 256×256. The low resolution images were upscaled to 256×256 for better visualization.

Unlike other natural imagery, biometric images contain identity-specific information that needs to be preserved during the deblurring. To this aim, a deep fingerphoto verifier module which can preserve the identity information can be incorporated. This verifier module can also help improve the deblurring performance through the loss function defined on the identification similarity of the generated and ground truth fingerphotos, which acts as a perceptual similarity loss. The decomposition of the deblurring task using a multi-stage approach along with a verifier network showed promising results on the test datasets. Due to the multi-stage approach in the FDeblur-GAN, unlike a traditional GAN, there are three L1 reconstruction loss terms. It computes the distance between the intermediate deblurred fingerphotos and the ground truth fingerphotos such that during the training the error from the intermediate layers is minimized. The reconstruction loss can be given by:

$$L_{L1}(x_s, G) = \sum_{i=1}^{3} \lambda_i \|x_s^i - x_r^i\|_1, \tag{6}$$

where i indicates the index of the intermediate layer in the generator used to extract the features and $x_s^i$ is the ground truth at the resolution of the i-th layer. The scaling coefficients $\lambda_1, \lambda_2, \lambda_3$ are selected using grid search and were set to 0.1, 0.4, and 0.6, respectively. Therefore, from Eq. 3, the objective function becomes:

$$G_{optimal} = \min_G \max_D O_{cGAN}(G, D_1, D_2, D_3) + L_{L1}(x_s, G). \tag{7}$$

Figure 16:
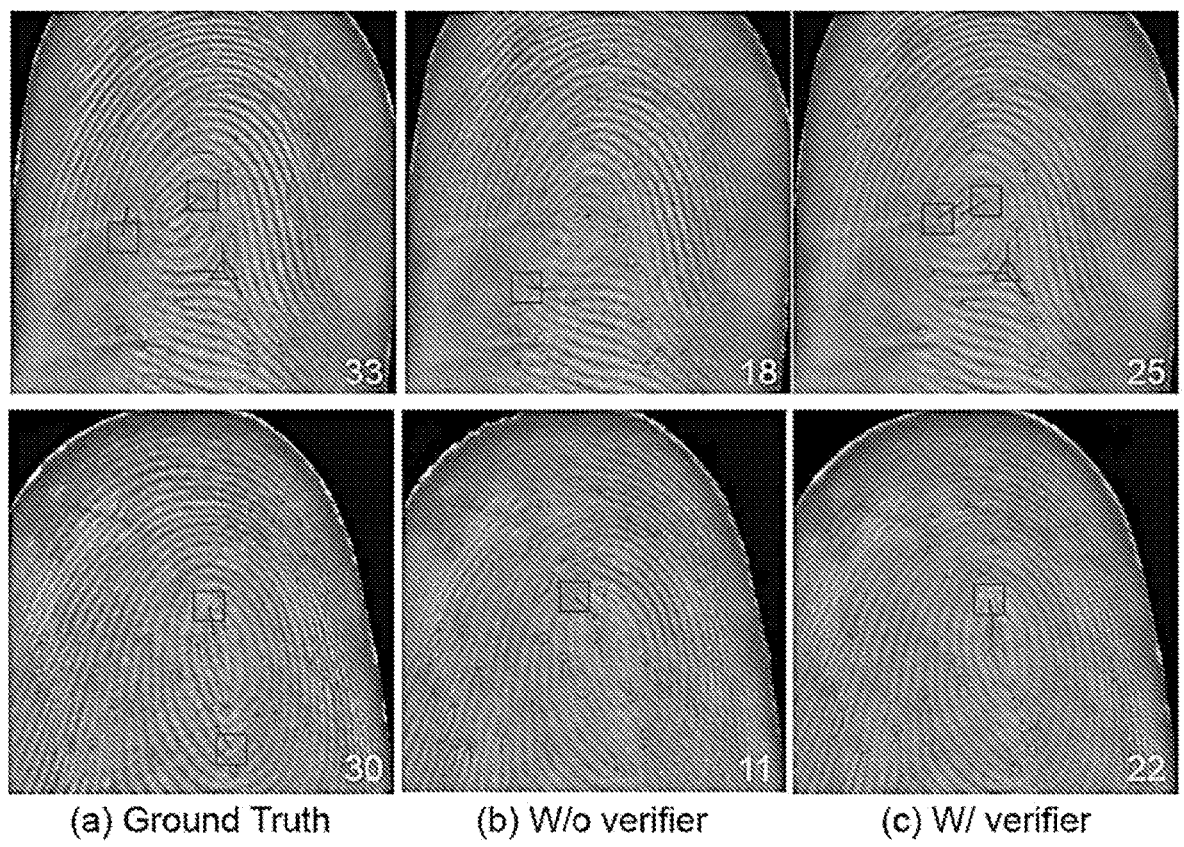
FIG. 16 illustrates examples of minutiae extraction on ground truth, deblurred fingerphoto by including and excluding the verifier, in accordance with various embodiments of the present disclosure

ID Preserving Network. While the multi-stage network deblurs the input fingerphotos using the adversarial and reconstruction loss, the underlying ID information which is important for further fingerphoto recognition, may not be preserved. The synthesized fingerphotos from the generator are the transformed representations of the source image and hence, may look similar to the source. However, there is no guarantee that the set of minutia points in the source and generated fingerphotos match. To deal with this problem, a Siamese Res-Net18 based verifier network V can be introduced. The verifier network can take the final output $x_r^3$ of the generator G and the ground truth fingerphoto $x_s^3$ and then return a feature vector for each image that represents the ID information from each of the fingerphotos. The Euclidean distance between the two, can be computed to construct the ID preserving loss as:

$$L_v(V, G) = \|V(x_s^3) - V(x_r^3)\|_2^2, \tag{8}$$

where $V(x_s^3)$ and $V(x_r^3)$ are the feature vectors for the ground truth fingerphoto $x_s^3$, and reconstructed fingerphoto $x_r^3$, respectively. This loss is minimized to make the feature representations as close as possible to one another. With this approach, it was observed (as illustrated in FIG. 16) that the deblurred fingerphotos have an almost identical set of minutia points as the corresponding sharp fingerphotos.

Even though, the verifier loss Ly helps produce better results, to fully leverage the verifier network, perceptual loss can be used as another loss measure. The merits of using perceptual loss for style transfer and image reconstruction tasks have been shown. To achieve a perceptual similarity between the generated and ground truth images, the images can be compared in the embedding of a pretrained model. A lower distance in the embedding of the pretrained model implies that a greater similarity exists between the two input fingerphotos (or that the fingerphotos are more similar to each other). Perceptual loss extracted from intermediate layers of VGG-19 like CNN can be widely adapted in image generation models. This approach works well on natural images, however the major difference between natural images and fingerphotos is the latter are more like a texture than an object or a scene. Therefore, a perceptual loss based on the ID of the fingerphoto which is obtained from the same verifier network can be used. Adding the L2 loss computed on all the intermediate representations of the verifier, balances the similarity of higher-level features such as the coarse ridge formation, and lower-level features such as pores and minutiae between the generated fingerphoto and the ground truth fingerphoto. This perceptual loss can be computed on three intermediate layers and can be defined as:

$$L_{perc}(V, G) = \sum_{i=1}^{3} \|V(x_s^3)_i - V(x_r^3)_i\|_2, \tag{9}$$

where i is the index of the residual block in the verifier network.

Guided-Attention (GA) Mechanism. The spatial attention mechanism is known to weigh the elements in the input feature maps such that the important elements are highlighted. In real world scenarios, the blurring effect is often non-uniform causing some parts of the finger to be blurred more intensively than other regions. This is referred to as local blurring. In such cases, some part of image is still visible, which the network can easily exploit and use to generate random ridge patterns based on the visible ones. To mitigate this problem, an attention mechanism can be utilized. The spatial attention block takes feature maps and produces the attention map which is then applied to the same features. In this way, the deblurring model attends to blurred region(s) of the fingerphoto and refrain from putting too much emphasize on the visible (easy-to-reconstruct) region(s). The last two layers of size 64×64 and 128×128 of the generator can be used to add the guided-attention (GA) block or mechanism.

Figure 4:
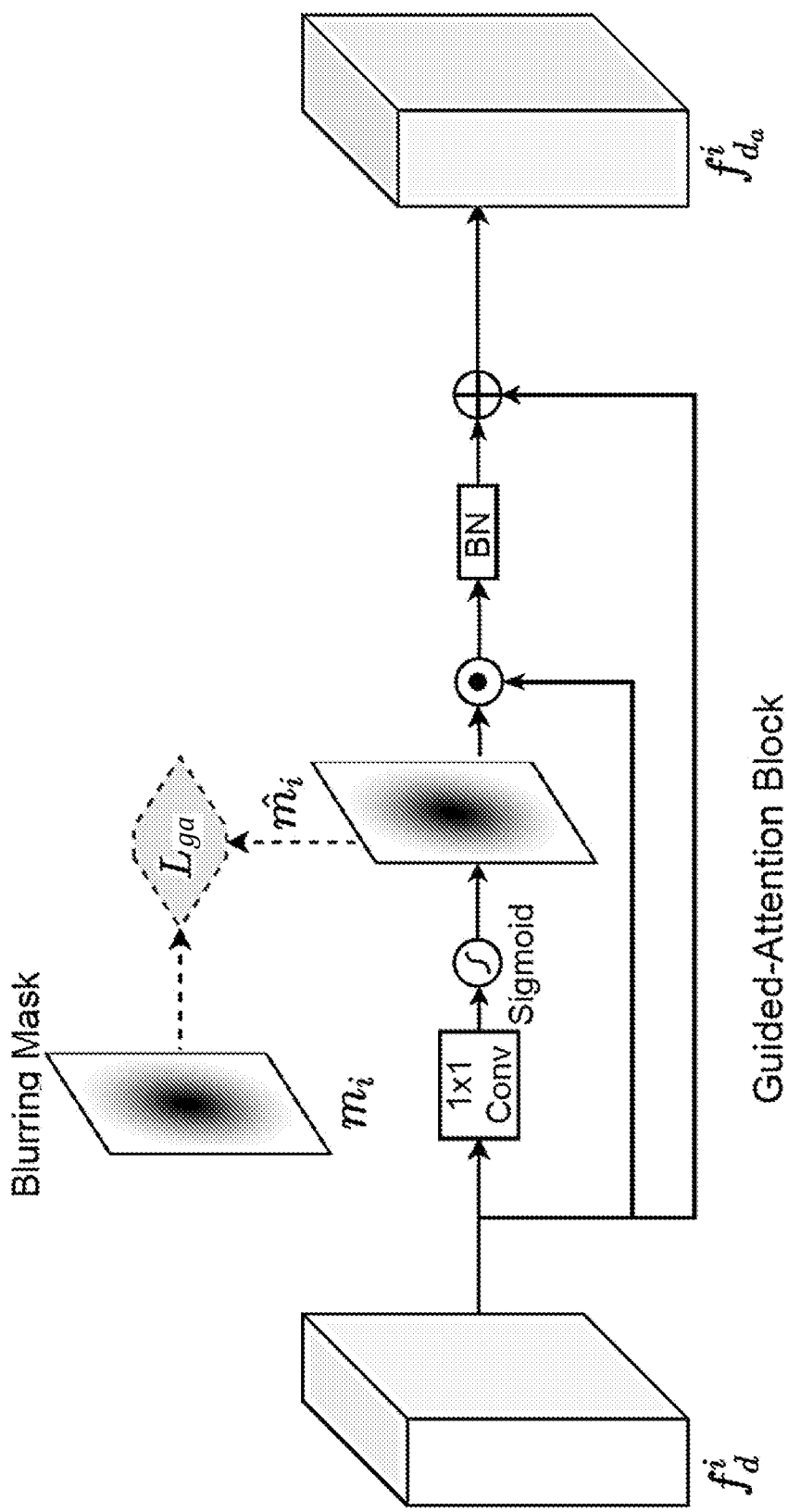
FIG. 4 is a schematic diagram illustrating an example of a guided-attention (GA) mechanism, in accordance with various embodiments of the present disclosure.

FIG. 4 is a schematic diagram illustrating an example of the guided-attention (GA) mechanism. BN in the schematic diagram represents a 2D batch normalization. $\hat{m}_i$ and $f_{d_a}^i$ are the generated attention map and output feature maps after applying the attenuation, respectively. The dotted lines represent connections that work only during training. Given the input features $f_d^i$, where i is the index of the corresponding layer, the GA block calculates an attention map $\hat{m}_i$ using a 1×1 convolutional layer followed by the Sigmoid function. Each attention map can be a single-channel tensor with values in the range [0, 1].

At each resolution, the GA mechanism of FIG. 4 multiples the predicted attention map $\hat{m}_i$ with the corresponding input feature map $f_d^i$ and applies a batch normalization (BN) to provide an attended feature map. Finally, the input feature map $f_d^i$ is added to the attended feature map to generate the final output features $f_{d_a}^i$. In the case of fingerphotos that are locally blurred, the sharp regions in the fingerphoto may affect the attention map on the blurred regions. Therefore, during the training additional guidance is provided to the attention map using a blurring mask $m_i$ which is generated while applying the blurring kernel. The predicted attention map $\hat{m}_i$ can be forced to be similar to the ground truth blurring mask which ensures that the attention is focusing towards the blurred region. The attention generation loss can be given by:

$$L_{ga} = \|\hat{m}^i - m^i\|_1. \quad (10)$$

Figure 5:
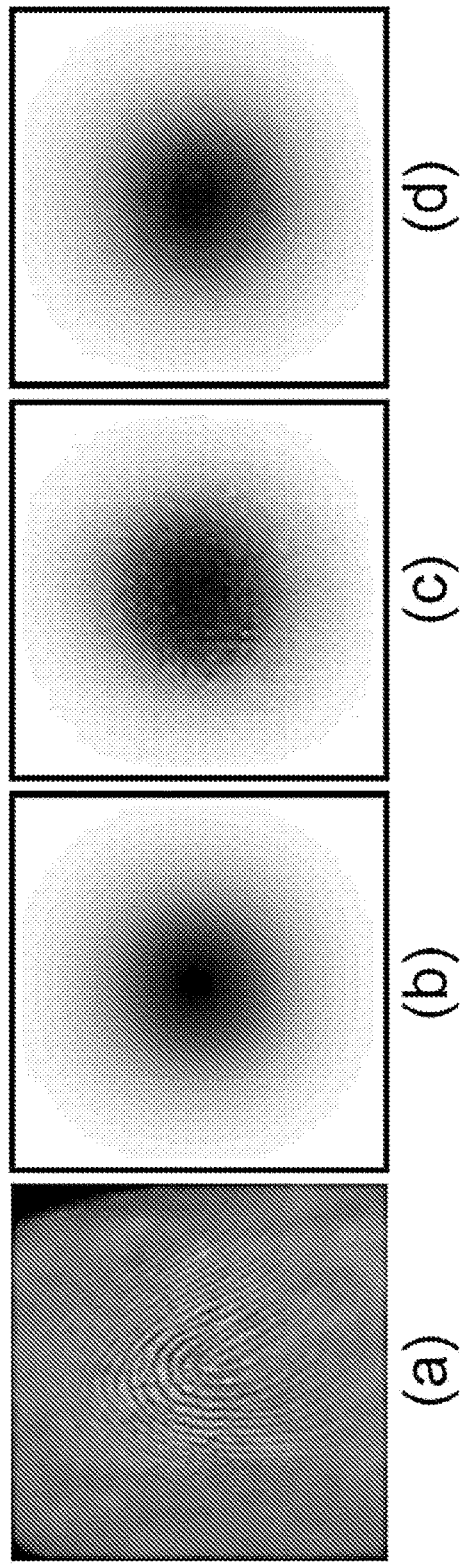
FIG. 5 illustrates examples of blurred samples generated using different blurring kernels and the corresponding attention maps, in accordance with various embodiments of the present disclosure.

FIG. 5 shows examples of the generated attention maps at different resolutions along with the blurring masks. The blurred samples were generated using different blurring kernels and the corresponding attention maps. In FIG. 5, image (a) has the blurred fingerphoto and image (b) has the corresponding partial blurring mask. Image (c) shows the generated attention map at resolution 64×64 and image (d) shows the attention map at resolution 128×128. In the mask and the attention maps, the white region is the blurred region where the attention is being paid. For samples where the whole fingerphoto is blurred, the blurring mask would be one everywhere.

Multi-Task Learning Model. During the initial phase of training the network, it was observed that the model is not robust to estimating correct blurring type. This can cause problems since if two blurring types are similar, the network may confuse them and generate a degraded quality output. Hence, another task can be added to explicitly force the model to identify the blurring type during deblurring. The multi-task learning (MTL) approach has shown that learning inter-related tasks can help each other and the primary task. For example, the MTL can be incorporated into the network and it can be shown that learning relatively simple and small sub-tasks together with a primary task works as well. In the entire network, a primary task of deblurring, a sub-task of predicting the blurring type, and a virtual task of generating a blurring mask can be included. To implement this, the features can be first branched-out from the second last layer of the decoder and passed to a fully connected layer. It can then produce two predictions of the blurring type (either Gaussian or motion blurring). In the example of FIG. 2, the cross-entropy loss $L_{ce}$ is minimized to get the accurate prediction of the blurring type. The cross-entropy loss can be given as:

$$L_{ce} = -(y \log(p) + (1-y)\log(1-p)); \quad (11)$$

where y indicates ground truth blurring type and p indicates predicted blurring type.

As previously mentioned, a virtual task of generating a blurring mask is learned. In the GA mechanism described above, the intermediate features are used to force them to be like the blurring mask. This reconstructed mask works as the attention which highlights the blurred area of a partially blurred fingerphoto. These two sub-tasks support the deblurring task to generate sharp fingerphotos. As will be discussed, it was empirically validated that the addition of the MTL module improves the performance of deblurring.

Objective Function. The total objective function of the generator can be the addition of all the cost terms listed above. Therefore, the updated cost function from Eq. 7 can be given by:

$$\begin{aligned} G_{optimal} = \min_G \max_D O_{cGAN}(G, D_1, D_2, D_3) & \quad (12) \\ + L_{L1}(x_s, G) & \\ + \lambda_v L_v(V, G) + \lambda_{perc} L_{perc}(V, G) & \\ + \lambda_{ga} L_{ga} + \lambda_{ce} L_{ce}. & \end{aligned}$$

The scaling coefficients $\lambda$ used for the loss terms were chosen empirically and were set to the optimal values. The effectiveness of each loss term was evaluated in the overall objective function further in ablation study presented below.

Network Architecture. As stated above, the base of the implemented deblurring network was a cGAN model which deblurs the input image. The generator G comprised a U-Net based network. The UNet architecture can include skip connections from the encoder to the decoder to preserve the residual information during training. In the encoder section, eight blocks of 4×4 convolutional layers along with batch normalization and ReLU activation were included. To reduce the spatial size of the image, a stride of two was used instead of using a pooling operation in the convolutional layers. The decoder section also included eight blocks having transposed convolutional layers with batch normalization, ReLU activation, and a stride of two to up-sample the image. The discriminator network was a three-layer PatchGAN discriminator. It classified the image as real or fake on every 70×70 patch of the output of the generator and the ground truth fingerphotos from the target domain. It included five 4×4 convolutional layers each followed by batch normalization and LeakyReLU activation. Out of the five, the first three convolutions had a stride of two and the rest had a stride of 1. FIG. 2 shows the details of the FDeblur-GAN architecture.

The ID preserving network (i.e., the verifier) was a Siamese network trained with contrastive loss using a ResNet-18 architecture. While training the FDeblur-GAN model, the weights of the verifier were frozen and used it for feature extraction. This network gets the same input as the last discriminator D3 in FIG. 2 and compares the two fingerphoto samples. During this, the features were extracted from conv1, conv2_x and conv4_x of the ResNet-18 architecture in the verifier and the L2 loss computed on each of them. Further, the guided-attention block has a 1×1 convolutional layer followed by a batch normalization and Sigmoid activation. Lastly, for predicting the blurring type, a fully connected layer which accepts 128 features and maps them to two outputs was used. These 128 features were obtained by applying global average pooling on the penultimate feature map in the generator model.

Experiments

The training setup and different experiments and ablation studies that were performed to evaluate the FDeblur-GAN model will now be elaborated on. The effects of deblurring on identification process will be examined. Training details and datasets are discussed, and the evaluation criteria and methods illustrated, followed by comparison with state-of-the-art deblurring method. Lastly, the evaluation on real-world blurred fingerphotos is presented.

Training. The proposed network was trained for 200 epochs with two Nvidia Titan X GPUs. The Adam optimizer was used as the optimizer with initial learning rate of $2 \times 10^{-4}$. The momentum parameters used were: $\beta_1 = 0.5$ and $\beta_1 = 0.999$, and the batch size of 16 was used during training. The PyTorch framework was used for the development and related experimentation of the project.

Datasets. For training and testing, the newly collected Multimodal Biometric Dataset1 (Biometrics and Identification Innovation Center, http://biic.wvu.edu/) which consists of 3,851 fingerphoto images belonging to around 600 subjects was used. This dataset was split into two parts, 3,542 images were used for training, and rest of them were used for testing. During the initial study, it was noticed that the blurred fingerphoto data is not readily available, and therefore, a synthetic dataset was created using a Gaussian, partial and motion blur with arbitrary kernel parameters. The kernel size for the Gaussian blur function is given by: k=6σ−1, where σ values were randomly chosen from the range of 1.5 to 4. For generating the partially blurred images, a non-uniform Gaussian blurred mask was used and applied to the fingerphoto to get the desired effect. Further, for generating motion blur effect, the method proposed in "DeblurGAN: Blind motion deblurring using conditional adversarial networks" by O. Kupyn, et al. (ArXiv e-prints, 2017) was used with the parameter values between 0.003 to 0.01 where, lower values generate more complex trajectories.

Figure 6:
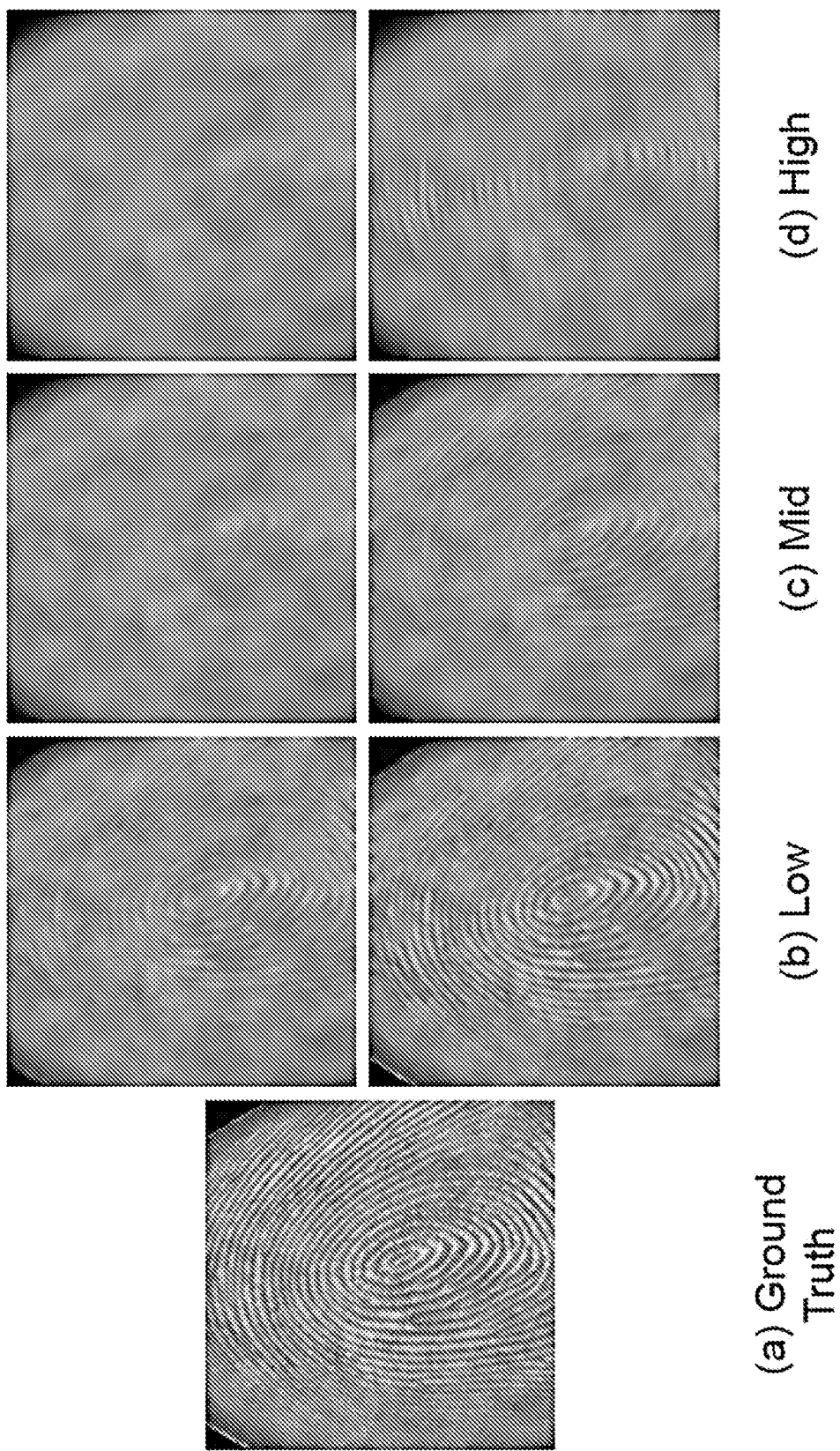
FIG. 6 illustrated examples of a ground truth fingerphoto and sample blurred input fingerphoto with low to high parameter values for the blurring kernels, in accordance with various embodiments of the present disclosure.

FIG. 6 shows some blurred samples. The sample blurred input fingerphoto is shown with low to high parameter values for the blurring kernels. Column (a) shows the ground truth fingerphoto. The data was augmented using random blurring kernels and blurring types while training. To ensure the robustness of the trained model, high-order blurring parameters were used during evaluation. The top row contains sample blurred using Gaussian blurring kernel with σ values of 2.0 in column (b), 3.0 in column (c), and 4.0 in column (d), respectively. The bottom row shows the sample blurred using the motion blurring kernel with parameter value 0.01 in column (b), 0.009 in column (c), and 0.005 in column (d), respectively.

Figure 7:
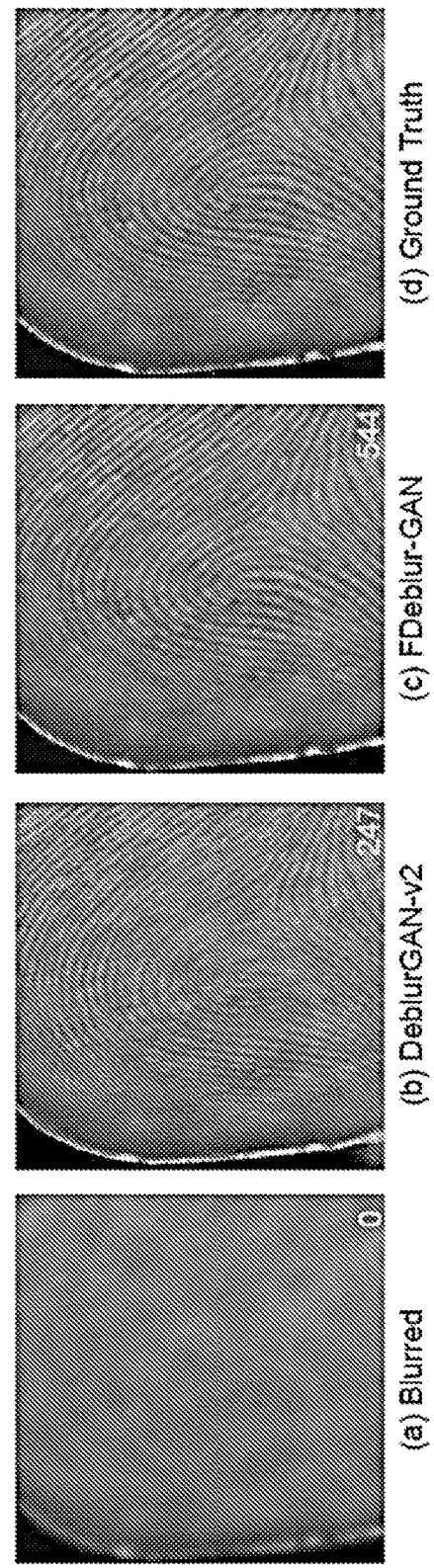
FIGS. 7-9 illustrate examples of samples of blurred and deblurred from WVU dataset, IIT-B dataset and PolyU dataset, in accordance with various embodiments of the present disclosure.

While generating blurring kernels, it was observed that if a motion blurring kernel has short trajectory or the magnitude of the σ in a Gaussian kernel is lower, the fingerphotos can be matched without deblurring. On the other hand, with higher magnitude of σ or motion blurring kernels with complex trajectories, the fingerphotos lose necessary information and become intractable. Therefore, a valid range for the parameters was empirically selected that results in good blurred samples. FIG. 7 shows an example of a blurred sample in image (a) and a ground truth sample in image (d) from the WVU multimodal dataset. A deblurred sample using DeblurGAN-v2 is shown in image (b) and using FDeblur-GAN is shown in image (c). The number on the bottom right corner represents the matching score between the ground truth and the corresponding fingerphoto using VeriFinger v10.0.

Preparing the dataset for the deblurring network included minimal processing on the sharp ground truth fingerphotos. Originally, the collected data contained noise, misaligned finger positions, etc. To eliminate such problems for the training data, skin detection was first applied on the images and the background replaced with black color. To get the correct finger ROI, finger ridge segmentation was performed using Gabor responses. Then, the finger core was extracted using the directional histogram of the directional image of the fingerphoto. After extracting the core point, a 256×256 image was cropped around the core and use that as the input to the FDeblur-GAN model. However, during cross-database evaluation all the steps mentioned above were not performed. Later in this section, the processing done on evaluation datasets is discussed.

For cross database evaluation, two publicly available datasets were used: "Touch and Touchless Fingerprint Dataset" by IIT-Bombay and the "Contactless Fingerprint Dataset" by the Hong Kong Polytechnical University, referred to as IIT-B dataset and PolyU dataset, respectively. The IIT-B dataset has 800 samples from 200 subjects, where all the samples were collected using a smartphone camera. The images in the dataset were segmented, therefore only the 256×256 region was center-cropped and converted to grayscale. Then the blurring kernels was applied to use for the evaluation task. During the matching experiment, one image was randomly selected from each subject in the gallery and the rest of the images used as the probe set.

Figure 8:
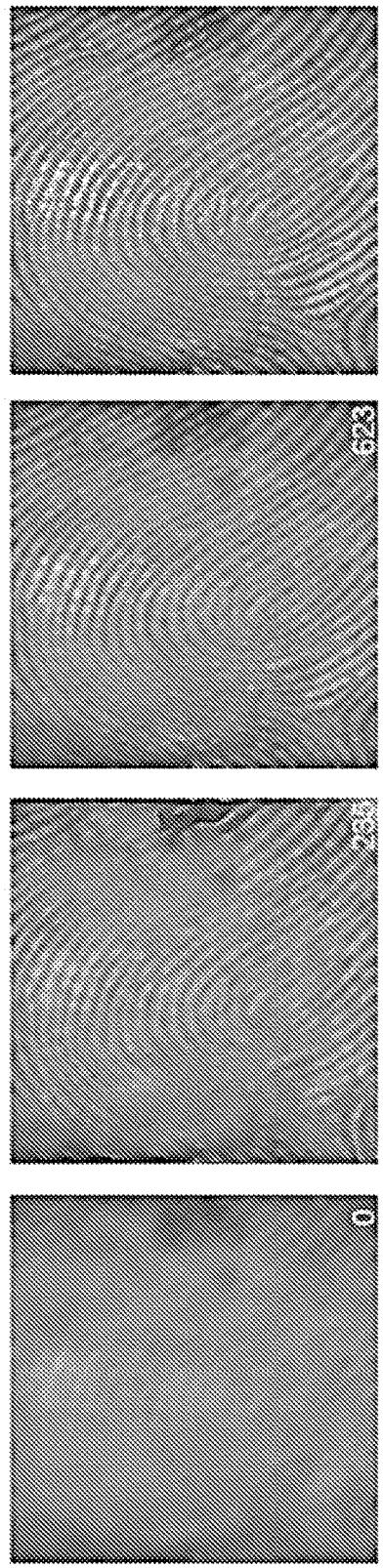
Figure 9:
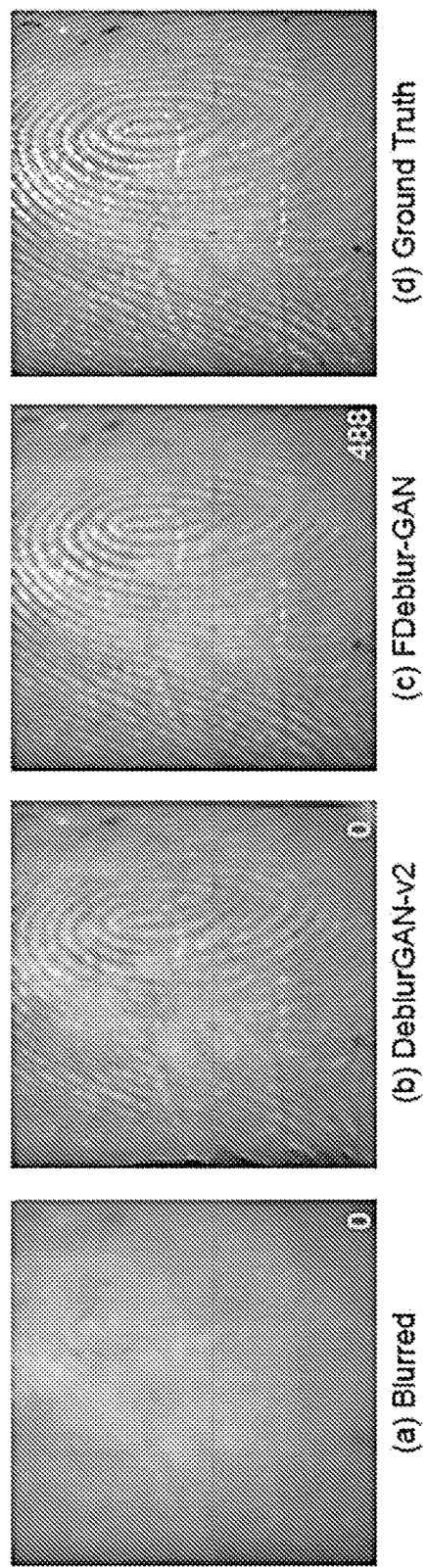

The PolyU dataset contains 2,976 images from 336 subjects and, similar to the IIT-B dataset, before applying blurring kernels, cropping and grayscaling was used on these images. Samples from IIT-B and PolyU datasets are depicted in FIGS. 8 and 9, respectively. FIG. 8 shows an example of a blurred sample from the IIT-B dataset and deblurred samples using DeblurGAN-v2 and FDeblur-GAN. FIG. 9 shows an example of a blurred sample from the PolyU dataset and deblurred samples using DeblurGAN-v2 and FDeblur-GAN. The number on the bottom right corner represents the matching score between the ground truth and the corresponding fingerphoto VeriFinger v10.0. TABLE I provides a comparison of performance based on the image quality metrics structural similarity index (SSIM) and peak-signal-to-noise-ratio (PSNR) on ground truth, blurred, and deblurred fingerphotos using DeblurGAN-v2 and FDeblur-GAN. Evaluations were conducted on the three datasets.

TABLE I

| Model | WVU | | IIT-B | | PolyU | |
|---|---|---|---|---|---|---|
| | SSIM | PSNR | SSIM | PSNR | SSIM | PSNR |
| DeblurGAN-v2 | 0.8646 | 26.2646 | 0.7993 | 25.4103 | 0.8462 | 26.5482 |
| Our | 0.9384 | 29.5637 | 0.9205 | 30.3644 | 0.9653 | 33.9360 |

Figure 10:
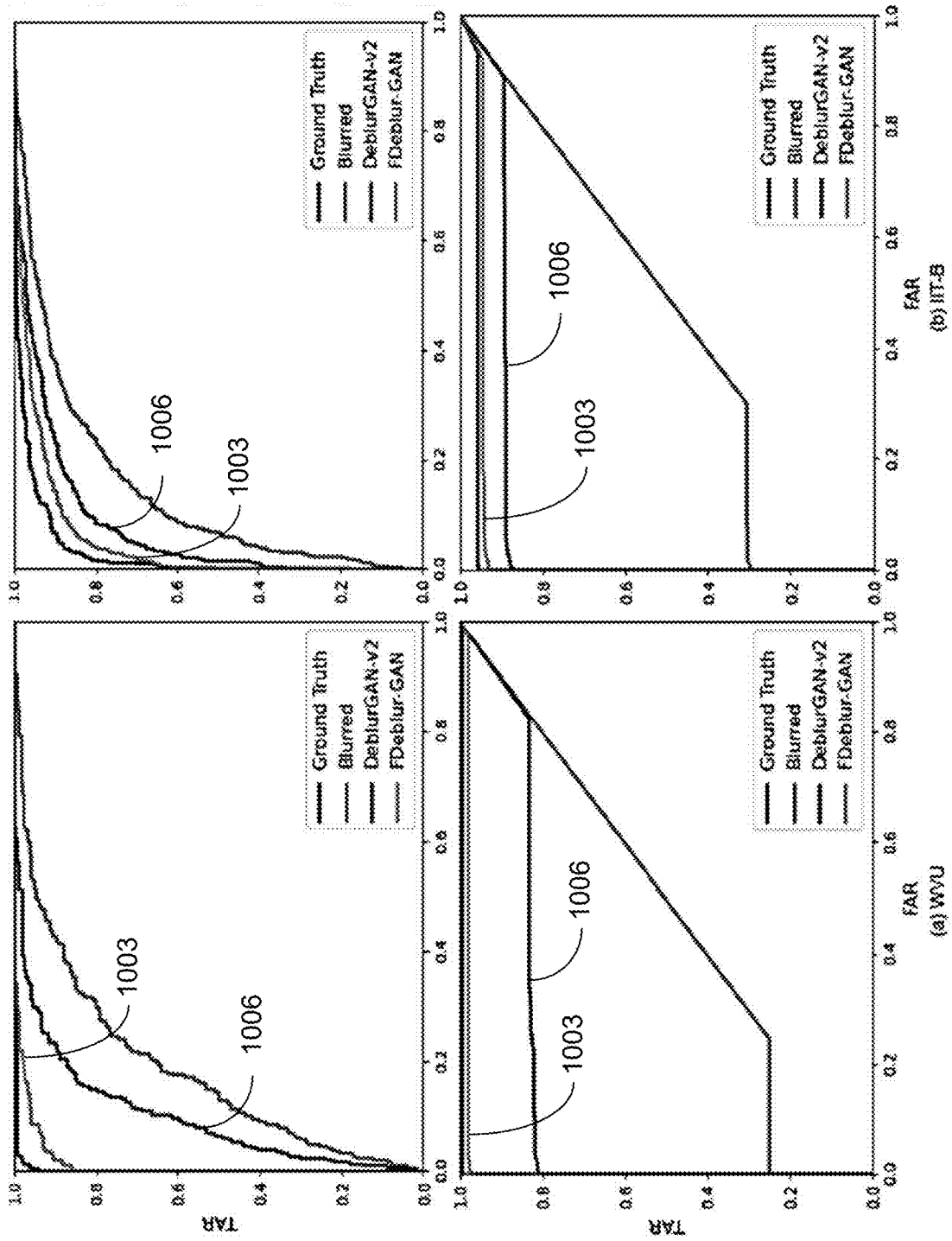
FIG. 10 illustrates the matching performance on the WVU, IIT-B and PolyU datasets and models, in accordance with various embodiments of the present disclosure.
Figure 10:
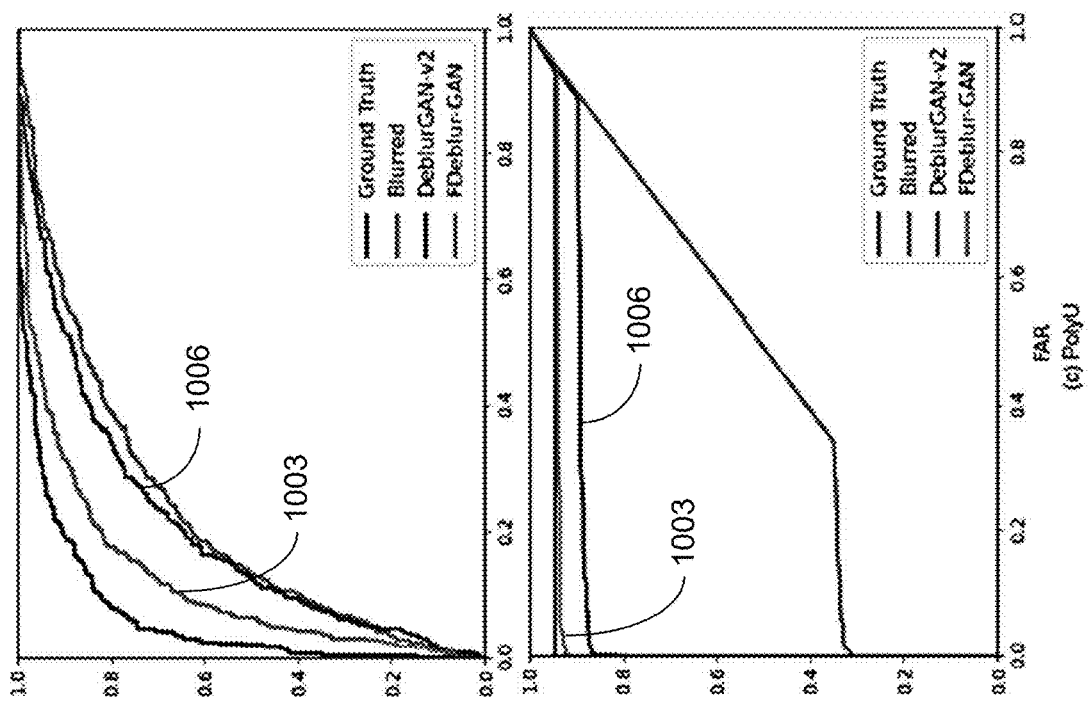
Figure 11:
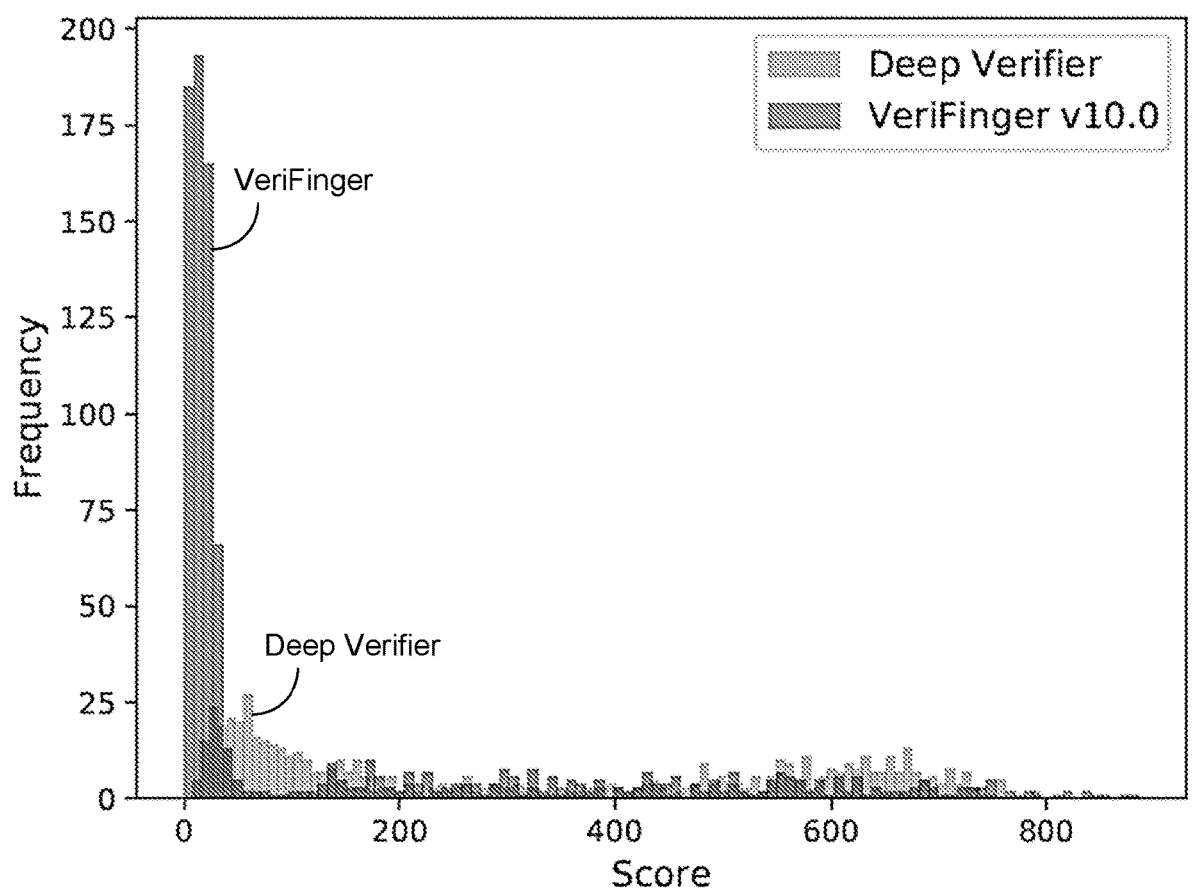
FIG. 11 illustrates an example of score distribution for the matching experiment on deblurred fingerphotos using FDeblur-GAN and VeriFinger, in accordance with various embodiments of the present disclosure.

Evaluation. For evaluating the performance, matching experiments were conducted on the ground truth, blurred, and deblurred fingerphotos using two different verifiers. One is the FDeblur-GAN deep verifier mentioned in Network Architecture section and the other one is the commercial VeriFinger SDK v10.0 fingerprint matcher. For the sake of fair comparisons, the genuine and impostor pairs were fixed for all the three datasets. FIG. 10 presents the results for these evaluations. Here, curves in the first and second row are generated using the FDeblur-GAN deep verifier and VeriFinger, respectively. In FIG. 10, column (a) represents curves for WVU dataset, column (b) represents curves for IIT-B dataset and column (c) represents curves for PolyU dataset. The FDeblur-GAN methodology, represented by curves 1003, outperforms the DeblurGAN-v2 (curves 1006). Note that, VeriFinger is a commercial matching software and therefore is highly sensitive to incorrect minutiae. As a result, a few wrong minutiae cause the score to drop significantly which causes the sharp peak in low scores making the ROC less smooth compared to the deep verifier. Detailed Area Under the Curve (AUC) and Equal Error Rate (EER) values are given in TABLE II, which provides a comparison of performance of the matching experiments on ground truth, blurred, and deblurred fingerphotos using DeblurGAN-v2 and FDeblur-GAN. Evaluations were conducted on all three datasets using the two different verifiers. FIG. 11 shows the score distribution for the two matchers on deblurred fingerphotos using the FDeblur-GAN deep verifier and VeriFinger. It can seem that the matching performance of the proposed FDeblur-GAN model closely follows the curve of the clean fingerphotos.

TABLE II

| Verifier | Deep Verifier | | | | | | VeriFinger | | | | | |
|---|---|---|---|---|---|---|---|---|---|---|---|---|
| | WVU | | IIT-B | | PolyU | | WVU | | IIT-B | | PolyU | |
| Model | EER(%) | AUC(%) | EER(%) | AUC(%) | EER(%) | AUC(%) | EER(%) | AUC(%) | EER(%) | AUC(%) | EER(%) | AUC(%) |
| Ground Truth | 1.6181 | 99.0131 | 8.9431 | 97.2123 | 14.4118 | 93.6531 | 0.6472 | 99.3580 | 4.2683 | 95.8693 | 5.5882 | 94.0063 |
| W/o Deblurring | 27.8317 | 78.8733 | 20.7317 | 86.3315 | 28.5294 | 77.8380 | 50.5405 | 51.1065 | 49.7810 | 54.8066 | 49.7194 | 55.9611 |
| DeblurGAN-v2 | 15.8576 | 90.3908 | 21.1765 | 84.9239 | 26.6176 | 79.8478 | 17.7994 | 84.3356 | 10.9756 | 89.7495 | 12.0425 | 80.4693 |
| Our | 5.8252 | 98.7704 | 12.0935 | 94.1447 | 18.3824 | 88.0564 | 1.9417 | 98.0622 | 5.8130 | 94.6539 | 6.6176 | 93.8511 |

Considering the matching experiment on the blurred fingerphotos as a baseline, the FDeblur-GAN model achieves a marginal performance boost on all the three test datasets in the deblurring task suggesting that the reconstruction quality of the deblurred fingerphoto is significantly improved. TABLE II shows the results of the verification experiment performed on the blurred data and the same experiment performed on the deblurred data. The lower EER demonstrates the ability of the proposed FDeblur-GAN model to deblur the fingerphotos and preserve the necessary identity information. Furthermore, the matching experiment was performed on deblurred samples at different resolutions to highlight the progressive improvement of the result in the FDeblur-GAN model. TABLE III presents the results for these evaluations. TABLE III provides a comparison of performance of the matching experiments at different scales of the deblurred fingerphotos. It can be observed that the matching performance is lower at low resolutions and boosts as the resolution increases. Deblurred visual samples from WVU, IIT-B and PolyU datasets are shown in FIGS. 7, 8 and 9, respectively.

TABLE III

| Scale | EER(%) | AUC(%) |
|---|---|---|
| 64 × 64 | 33.3333 | 72.8066 |
| 128 × 128 | 9.3851 | 96.6575 |
| 256 × 256 | 5.8252 | 98.7704 |

Figure 12:
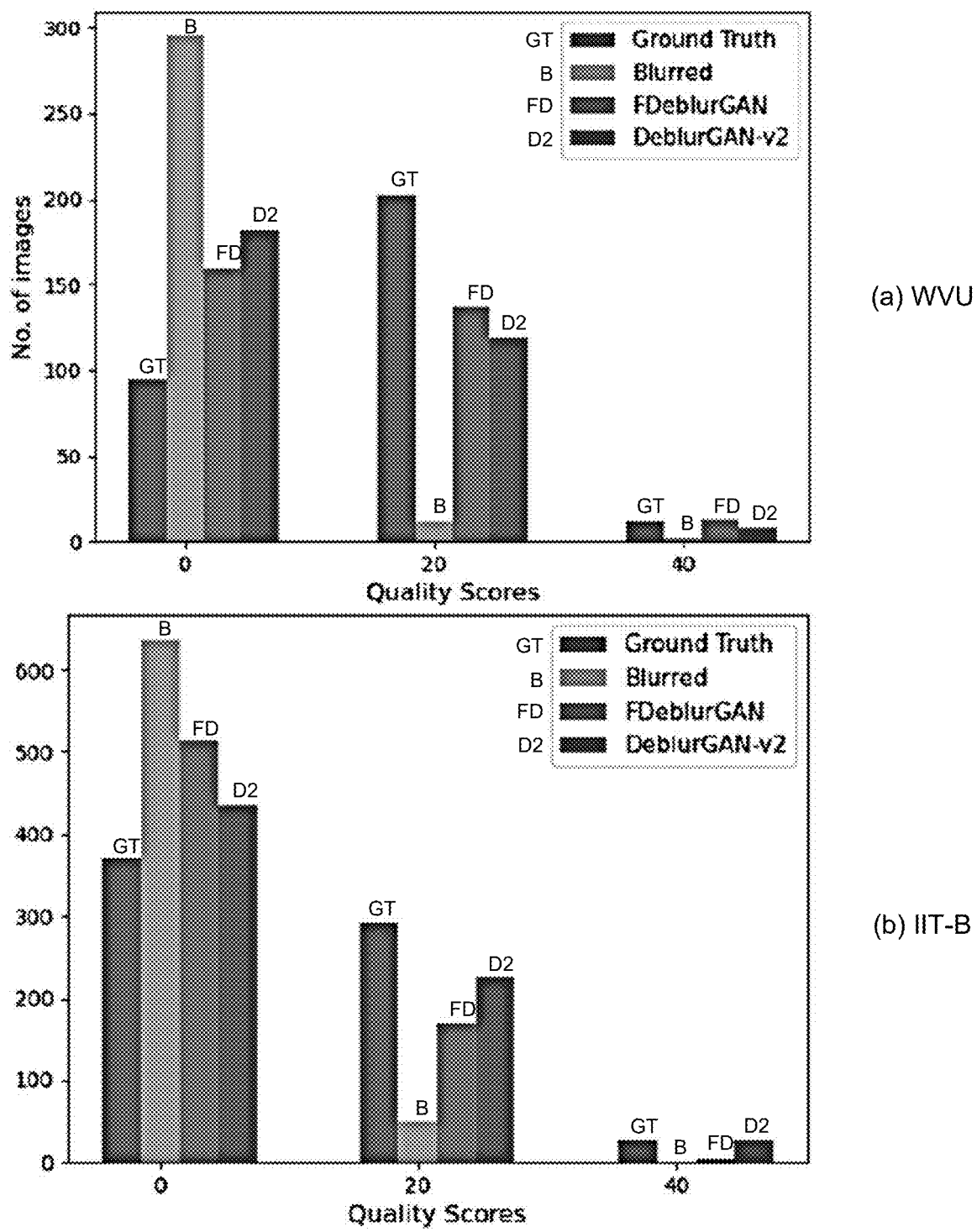
FIG. 12 illustrates examples of NFIQ2 quality score assessment of the ground truth, blurred, and deblurred fingerphotos from DeblurGAN-v2 and FDeblur-GAN, in accordance with various embodiments of the present disclosure.
Figure 12:
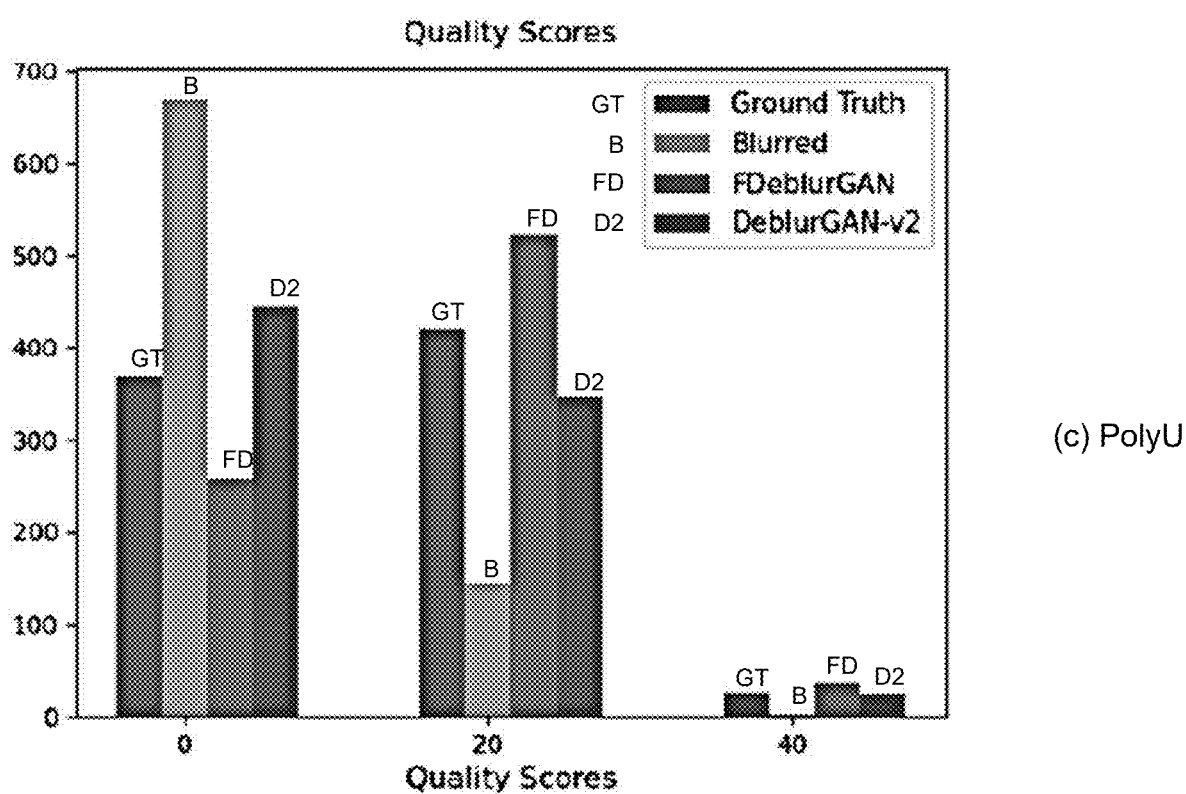

Furthermore, the quality scores of the images were calculated using NIST NFIQ2 tool provided by NBIS software. The NFIQ2 tool provides quality scores from 0 to 100 for the quality of the fingerprints, where 0 means no utility value and 100 is considered the highest utility value. The FDeblur-GAN model preserves and in some cases improves the quality of the ground truth fingerphotos during the deblurring process. The quality score plots for the three test sets are shown in FIG. 12, which shows the NFIQ2 quality score assessment of the ground truth, blurred, and deblurred fingerphotos from the DeblurGAN-v2 and FDeblur-GAN. Plots (a), (b), and (c) show the quality scores of samples from the WVU Multimodal dataset, the IIT-B dataset, and the PolyU dataset, respectively. The first bar represents the number of ground truth fingerphotos, the second bar represents the number of blurred fingerphotos, and third bar represents the number of deblurred fingerphotos from FDeblur-GAN, respectively. The fourth bar represents the number of deblurred fingerphotos from DeblurGAN-v2.

Comparison with State of the Arts. Since there is no fingerphoto deblurring algorithm available, some natural image deblurring methods were reviewed. Even though state-of-the-art deblurring techniques work effectively on blurred natural images, they lack the ID preservation essential in biometric data. Despite that fact, the FDeblur-GAN method was tested and compared against state-of-the-art deblurring algorithm DeblurGANv2. Provided trained weights were used and the network fine-tuned on the same training set that was used for training the FDeblur-GAN algorithm. TABLE II and FIG. 10 present the comparison results on WVU multimodal, IIT-B, and PolyU dataset, respectively. As expected, the FDeblur-GAN model performs better in terms of ID preservation due to the verifier network that penalizes ID disparities between the generated and the ground truth fingerphoto. Using TABLE IV (performance of MCGAN-A) and TABLE II (performance of DeblurGAN-v2 on WVU dataset), it can be observed that the FDeblur-GAN method, regardless of the verifier, performs better than DeblurGAN-v2. TABLE IV shows results of each model tested for the ablation study.

TABLE IV

| Model | EER(%) | AUC(%) |
|---|---|---|
| Plain cGAN | 12.2977 | 95.3122 |
| McGAN | 10.8560 | 96.2673 |
| McGAN-A | 10.3560 | 96.3165 |
| McGAN-AV W/o Perceptual | 7.4434 | 97.7744 |
| McGAN-AV | 6.1489 | 98.5683 |
| FDeblur-GAN | 5.8252 | 98.7704 |

Evaluation on Real-World Data. In order to make a fair evaluation, it is imperative to verify the model performance on realworld blurred fingerphotos. Since there is no readily available data for such evaluation, a few samples were collected and used for the evaluation. The blurry and sharp pairs of fingers were captured using a digital camera and rudimentary processing like segmentation, ROI cropping, and grayscaling applied on them. Furthermore, the minutiae of all the fingerphotos were extracted using VeriFinger SDK v10.0 and a matching experiment conducted among the ground truth, blurred, and deblurred fingerphoto. Calculating ROC curve based on a small number of images may not be reliable, hence the minutiae points of ground truth were matched with the blurred and deblurred fingerphoto.

Figure 13:
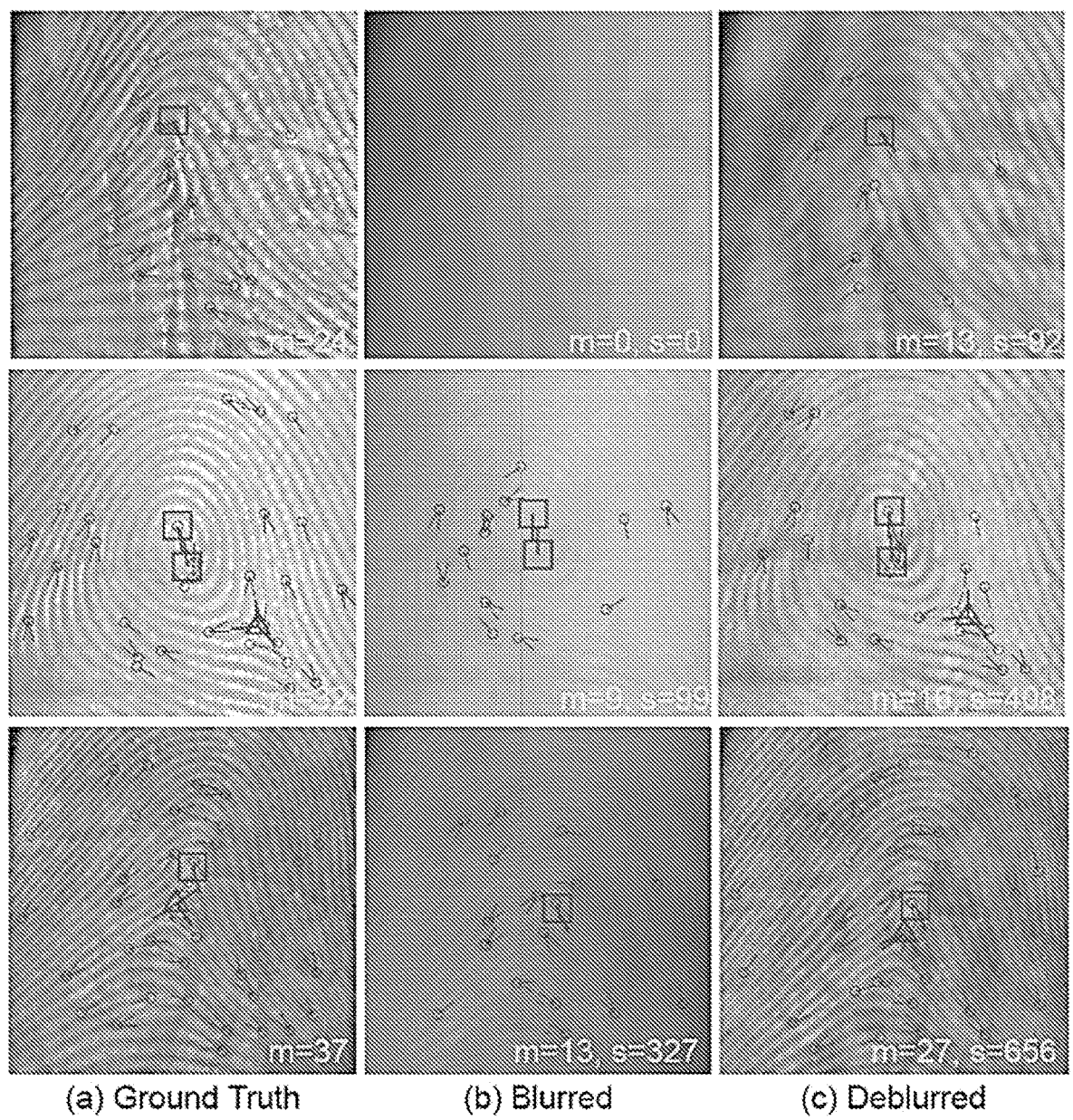
FIG. 13 illustrates examples of real-world blurred fingerphotos, in accordance with various embodiments of the present disclosure.

FIG. 13 shows the samples of real-world blurred fingerphotos and the minutiae count. Numbers in the bottom right corner of each image shows the number of minutiae points that match with the ground, truth denoted by m, and the matching score between the fingerphoto and corresponding ground truth, denoted by s. It can be noticed that the minutiae points in the blurred images hardly match with those in the ground truth due to the blurring distortion. However, the deblurring process recovers approximately 60% of the minutiae suggesting that the deblurring method is enhancing information at such detail that improves the matching performance. Additionally, the low matching scores for the ground truth and the blurred fingerphoto confirms the degraded quality of the blurred fingerphoto. On the other hand, the matcher produces high score values when the ground truth is compared with the deblurred fingerphoto. This validates the robustness of the FDeblur-GAN model towards complex and random blurring kernels in real-world. It also shows the potential that given a real-world blurred data, the model can be fine-tuned on a subset and achieve state-of-the-art deblurring performance on the test set.

Ablation Study

In this section, the contribution of each modification in the generator G towards the deblurring and matching performance is explored. Here, the baseline model is a plain cGAN and one modification is made at a time and the resulting model evaluated. First, the architecture was modified with multi-stage framework (McGAN). Then, the attention mechanism was added to the McGAN model (McGAN-A). Next, the verifier network was added to McGAN-A (McGA-NAV) and finally, the classifier was added to the previous network to get the proposed FDeblur-GAN model. In the following sections, the contribution of each part of the model to the final performance is discussed.

Deblurring with Plain Model. First, to determine the performance of the cGAN, the model was trained without any additional constraints. With the advent of image-to-image translation, the deblurring task is primitive for the network, but preserving the necessary information is challenging. TABLE IV shows the results of the plain cGAN model. This performance can be used as a baseline for further experiments.

Figure 14:
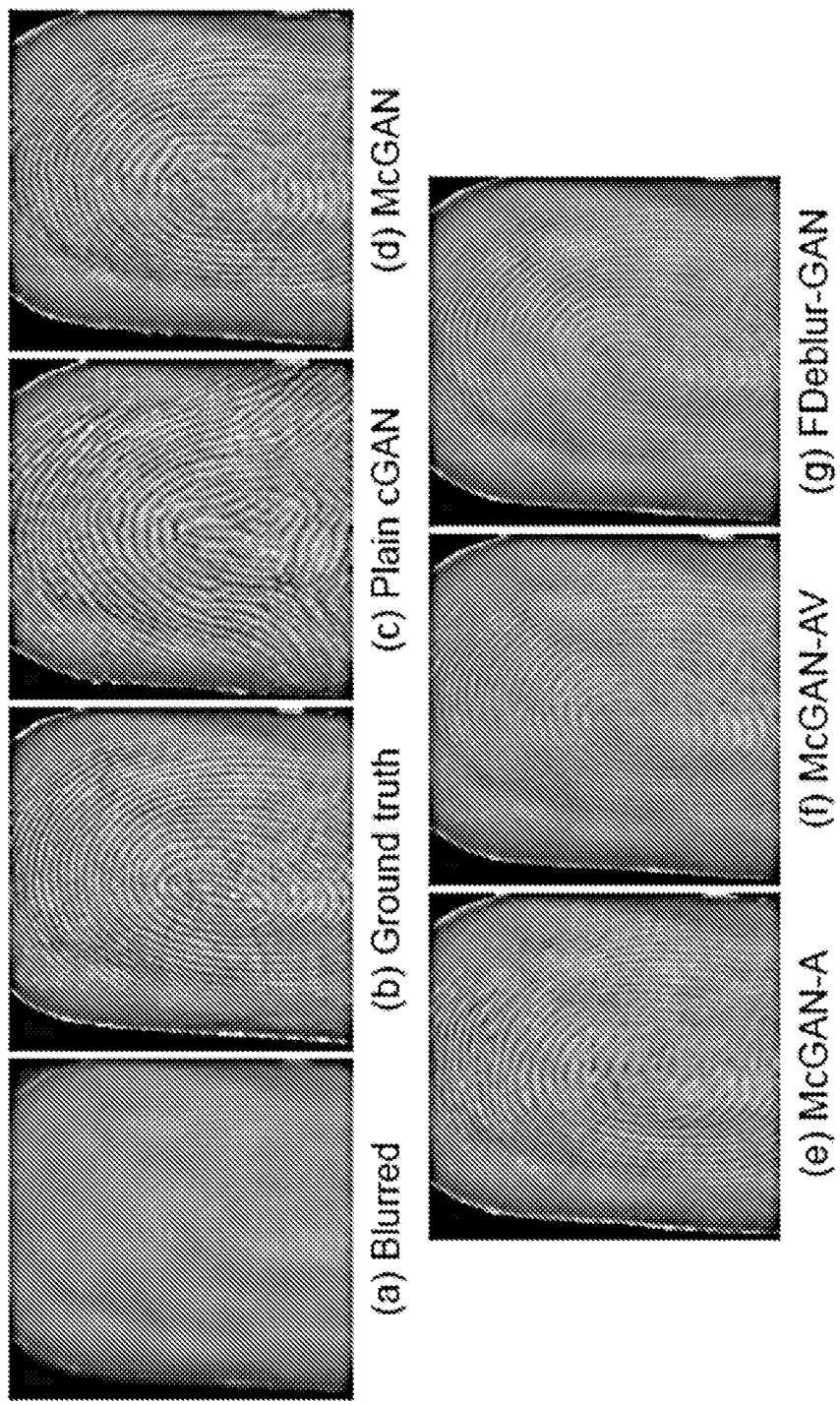
FIG. 14 illustrates the impact of each module in FDeblur-GAN on the quality of the deblurred samples, in accordance with various embodiments of the present disclosure.

FIG. 14 visualizes the impact of each module in FDeblur-GAN on the quality of the deblurred samples. Image (a) shows an input blurred fingerphoto. Image (b) shows a corresponding ground truth fingerphoto. The rest of the images show deblurred output of: (c) plain cGAN model, (d) multi-stage plain cGAN (McGAN), (e) McGAN with guided attention (McGAN-A), (f) McGAN-A with verifier (McGAN-AV), (g) McGAN-AV with multi-tasking (FDeblur-GAN). As illustrated in image (c) of the deblurred sample from the cGAN model, the plain cGAN model is able to produce deblurred fingerphotos with good visual quality. However, the generated fingerphotos have erroneous ridge patterns and minutia points due to the lack of a proper constraint to preserve the ID. Such a shortcoming often alters the identity of the fingerphoto deteriorating the recognition performance. Based on this observation, the multistage deblurring model was added to the plain cGAN network to force the generator to consider the ID of the fingerphotos during the generation process.

Effect of Multi-stage Approach. As previously discussed, a coarse-to-fine multi-stage scheme was developed to enhance the performance of deblurring. The results in TABLE IV and FIG. 3 demonstrate that guiding the generator by forcing the intermediate features to mimic the coarse structure of the ground truth images indeed improves the performance of deblurring. Particularly, based on TABLE IV, employing multiple discriminators improves EER and AUC by 2% and 1%, respectively. As the results in TABLE III indicate, having more than three stages would degrade the performance. Fingerphotos at a 32×32 resolution may not have enough useful low-level information for helping multi-stage scheme. On the other hand, the matching performance at 64×64 resolution has a moderate AUC of 72.8066 and hence, excluding this stage might worsen the final deblurring performance. Therefore, for the optimal deblurring performance the multi-stage scheme incorporated with three stages.

Figure 15:
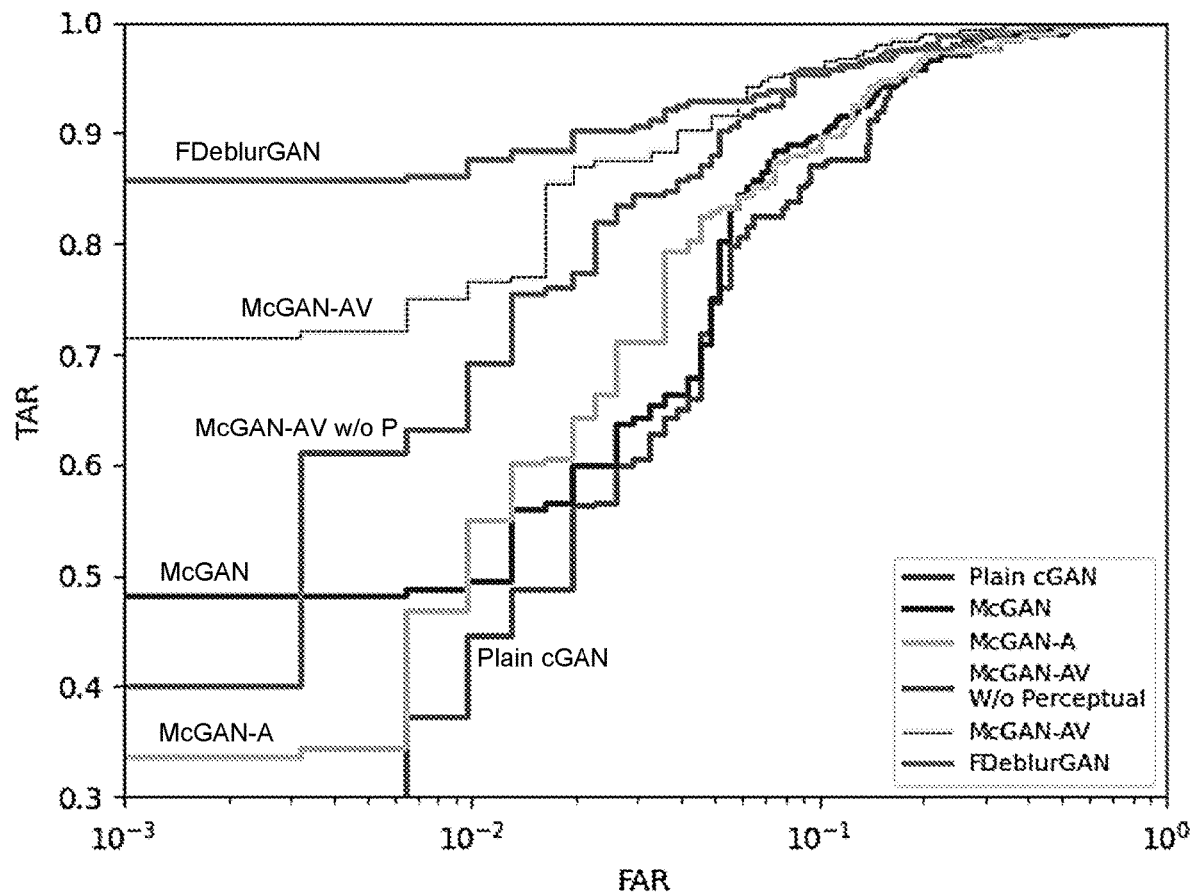
FIG. 15 illustrates examples of log scaled ROC curves of different models evaluated during the ablation study, in accordance with various embodiments of the present disclosure.

Evaluation Without Verifier. Further, the proposed FDeblur-GAN was tested without the verifier network and removed the $L_v$ and $L_{perc}$ loss terms from the overall network objective function in Eq. 12. In the case of fingerphoto deblurring, the best way to evaluate the model performance is by monitoring the identification performance. FIG. 15 and TABLE IV shows the degraded performance without the verifier. FIG. 15 illustrates log scaled ROC curves of different models evaluated during the ablation study. TAR and FAR are True Acceptance Rate and False Acceptance Rate, respectively. The AUC and EER details are in TABLE IV.

The verifier network is one of the constraints on the generator which restricts it to deblur the images while keeping the minutiae points and the ridge patterns similar. The verifier plays an important role in the training. It enforces the generator to preserve the ID information from the blurred fingerphoto. To support this claim, the minutiae points were extracted from the deblurred fingerphoto generated without including the verifier using VeriFinger SDK v10.0 and compared against the minutiae of the ground truth and deblurred fingerphoto from FDeblur-GAN. FIG. 16 shows the comparison of the minutiae extraction on ground truth and deblurred fingerphoto by including and excluding the verifier. The number in the bottom right corner of each image shows the number of minutiae points that match with the ground truth. As the verification cost term is added to the final objective function in Eq. 12, it resulted in a 2.5% drop in the accuracy of the identification task.

Moreover, the network was tested by excluding the loss of the intermediate features of the verifier which was treated as a perceptual loss. As shown in TABLE IV, due to the generalized characteristics in the intermediate features, the network performs better in identifying the fingerphotos. According to FIG. 15, without the intermediate feature loss, the accuracy in the lower FAR region is low. However, adding the loss term improves the accuracy in specifically the lower FAR region, which is the critical performance region in real-world applications.

Traditional Perceptual Loss vs. ID based Perceptual Loss. In this section, the effectiveness of conventional perceptual loss against the ID based perceptual loss is explored. The goal is to generate fingerphotos that are perceptually similar to the ground truth sharp fingerphoto. To this aim, a perceptual loss was introduced to the overall loss function. Conventionally, a pre-trained network VGG-19 network trained on ImageNet dataset is used to extract general features from intermediate convolutional layers. To compare the extracted features, MSE was calculated and added to the total loss in Eq. 12 to improve the perceptual similarity. However, the VGG-19 network is trained on natural images while the patterns in fingerphotos are constructed by the ridges and valleys mainly forming random textures with specific characteristics. Hence, there is a discrepancy between the distribution of features in the two domains. It was observed that in this situation, using the conventional perceptual loss is not helpful and using a pre-trained network which is trained on fingerphotos is a prudent choice. Hence, features from the FDeblur-GAN deep verifier were extracted and used to compute the alternative perceptual loss. In TABLE V, the effect of using conventional perceptual loss vs. the ID preserving perceptual loss is illustrated. TABLE V shows matching experiment performance on deblurred fingerphotos using perceptual and ID preserving perceptual loss term. These results confirm that in fingerphoto reconstruction tasks, using a model pretrained on a similar domain results in a better performance compared to the classical method for computing the perceptual loss.

TABLE V

| Model | EER(%) | AUC(%) |
| --- | --- | --- |
| W/o Perceptual Loss | 7.4434 | 97.7744 |
| W Conventional Perceptual Loss | 6.7961 | 98.1190 |
| W ID Preserving Perceptual Loss | 5.8252 | 98.7704 |

Balancing Constraints on Deblurring. In the multi-constrained setting of the proposed network architecture, each constraint has a unique role and therefore, they need to be balanced optimally to get better deblurring performance. Here, the usefulness of other constraints such as the guided attention and multi-task learning was emphasized. Adding the attention block to the network does not improve the AUC marginally, however, it enhances the reconstruction capability of the network. In the case of partially blurred fingerphoto, during deblurring the network may copy the sharp region and neglect the blurred part. However, due to the attention block, it focuses on the blurred region and neglects the sharp region in a fingerphoto. Subtle visual improvements can be observed in images (d) and (e) of FIG. 14.

Additionally, to evaluate the usefulness of multi-task learning in the propose network, the blurring type classification module was removed from the network and the performance. Images (f) and (g) of FIG. 14 show the deblurred fingerphoto with and without the classifier module checked. During deblurring the generator tries to estimate the blurring kernel and then deblurs the input fingerphoto. Without the classification module, the network confuses between the Gaussian and motion blurring kernel affecting the matching performance. On the other hand, when the classifier is included, it estimates the blurring type and helps the generator to produce better fingerphoto regardless of the blurring kernel.

Figure 17:
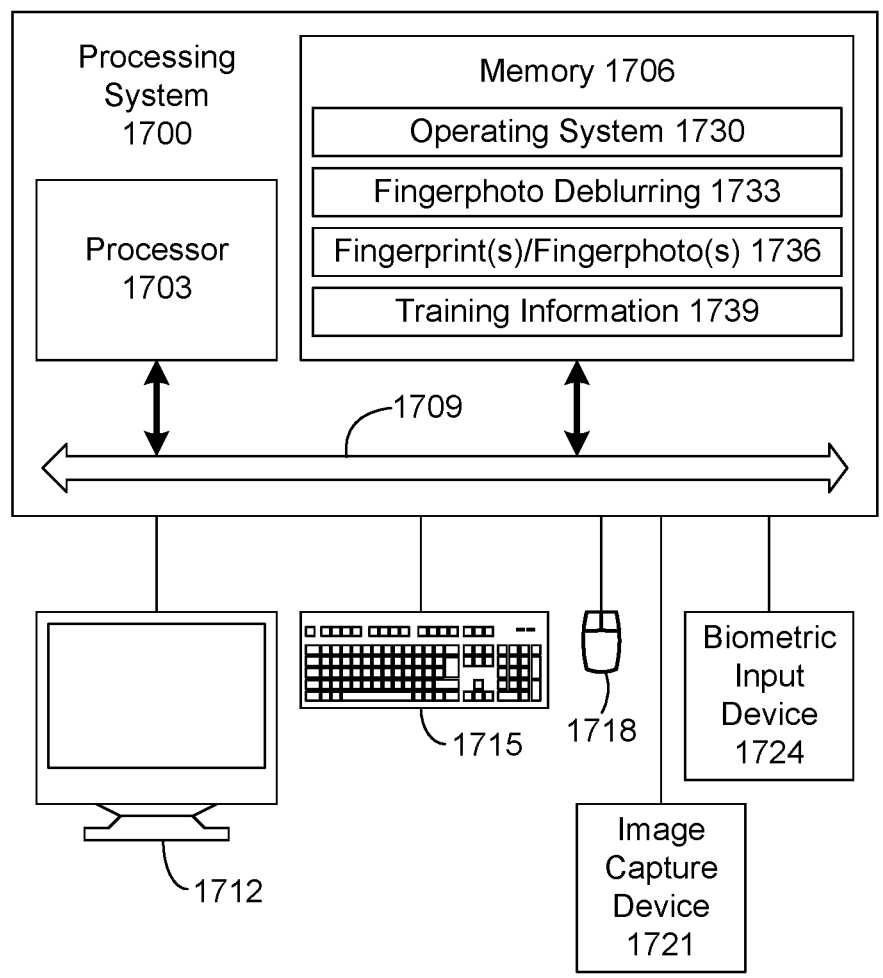
FIG. 17 is a schematic block diagram of one example of a system employed for fingerprint distortion rectification, in accordance with various embodiments of the present disclosure.

Referring next to FIG. 17, shown is one example of a system that performs various functions for fingerphoto deblurring according to the various embodiments as set forth above. As shown, a processing system 1700 is provided that includes processing circuitry having, e.g., a processor 1703 and a memory 1706, both of which are coupled to a local interface 1709. The local interface 1709 may be, for example, a data bus with an accompanying control/address bus as can be appreciated by those with ordinary skill in the art. The processing system 1700 may comprise, for example, a computer system such as a server, desktop computer, laptop, smartphone, tablet, personal digital assistant, or other system with like capability.

Coupled to the processing system 1700 can be various peripheral devices such as, for example, a display device 1712, a keyboard 1715, and a mouse 1718. In addition, other peripheral devices that allow for the capture of various patterns may be coupled to the processing system 1700 such as, for example, an image capture device 1721, or a biometric input device 1724. The image capture device 1721 may comprise, for example, a digital camera or other such device that generates images that comprise patterns to be analyzed as described above. Also, the biometric input device 1724 may comprise, for example, a fingerprint input device, optical scanner, or other biometric device as can be appreciated.

Stored in the memory 1706 and executed by the processor 1703 are various components that provide various functionality according to the various embodiments of the present invention. In the example embodiment shown, stored in the memory 1706 is an operating system 1730 and a fingerphoto deblurring application 1733. In addition, stored in the memory 1706 are various fingerprint(s) or fingerphoto(s) 1736 and various training information 1739. The training information 1739 can comprise, e.g., contactless fingerprint(s) or fingerphoto(s) associated with corresponding contact-based fingerprint(s) 1736. The fingerprint(s) or fingerphoto(s) 1736 and the training information 1739 may be stored in a database to be accessed by the other systems as needed. The fingerprint(s) or fingerphoto(s) 1736 can comprise fingerprint images or other patterns as can be appreciated. The fingerprint(s) or fingerphoto(s) 1736 can comprise, for example, a digital image or representation of physical patterns or digital information such as data, etc.

The fingerphoto deblurring application 1733 can be executed by the processor 1703 in order to generate a deblurred fingerphoto as described above. A number of software components can be stored in the memory 1706 and can be executed by the processor 1703. In this respect, the term "executable" means a program file that is in a form that can ultimately be run by the processor 1703. Examples of executable programs may be, for example, a compiled program that can be translated into machine code in a format that can be loaded into a random access portion of the memory 1706 and run by the processor 1703, or source code that may be expressed in proper format such as object code that is capable of being loaded into a of random access portion of the memory 606 and executed by the processor 1703, etc. An executable program may be stored in any portion or component of the memory 1706 including, for example, random access memory, read-only memory, a hard drive, compact disk (CD), floppy disk, or other memory components.

The memory 1706 is defined herein as both volatile and nonvolatile memory and data storage components. Volatile components are those that do not retain data values upon loss of power. Nonvolatile components are those that retain data upon a loss of power. Thus, the memory 1706 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 1703 may represent multiple processors and the memory 1706 may represent multiple memories that operate in parallel. In such a case, the local interface 609 may be an appropriate network that facilitates communication between any two of the multiple processors, between any processor and any one of the memories, or between any two of the memories etc. The processor 1703 may be of electrical, optical, or molecular construction, or of some other construction as can be appreciated by those with ordinary skill in the art.

The operating system 1730 is executed to control the allocation and usage of hardware resources such as the memory, processing time and peripheral devices in the processing system 1700. In this manner, the operating system 1730 serves as the foundation on which applications depend as is generally known by those with ordinary skill in the art.

Although the fingerphoto deblurring application 1733 can be embodied in software or code executed by general purpose hardware, as an alternative the same may also be embodied in dedicated hardware or a combination of software/general purpose hardware and dedicated hardware. If embodied in dedicated hardware, the fingerphoto deblurring application 1733 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowcharts of FIGS. 2 and 4 show examples of the architecture, functionality, and operation of an implementation of the fingerphoto deblurring application 1733. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flowcharts of FIGS. 2 and 4 show a specific order of execution, it is understood that the order of execution may differ from that which is depicted. For example, the order of execution of two or more blocks may be scrambled relative to the order shown. Also, two or more blocks shown in succession in FIGS. 2 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the fingerphoto deblurring application 1733 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the fingerphoto deblurring application 1733 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In this disclosure, a novel methodology for deblurring fingerphotos by introducing several modifications to the conditional generative adversarial networks is presented. First, a coarse-to-fine scheme was developed using a multi-stage framework that deblurs the fingerphoto at different resolution, enhancing the overall deblurring performance of the model. Second, an ID preserving network was developed to ensure that the reconstructed image has not lost the unique ID information (e.g., the formation of minutiae) in the fingerphoto. Third, a novel attention block was developed that helps the generator to focus more on blurred region of the fingerphoto enabling the network to deblur partially blurred fingerphotos effectively. Additionally, the multi-task learning approach used in the generator of the cGAN is a non-traditional method which estimates the blurring type to improve the accuracy of the fingerphoto deblurring task. Furthermore, the usefulness of each module in our deblurring model was investigated using extensive ablation studies. This work considers global and local, uniform and non-uniform blurring effects along with motion and Gaussian blurring types. The effectiveness of the proposed deblurring model was validated using several matching experiments on multiple synthetically blurred fingerphoto datasets as well as naturally blurred fingerphotos. FDeblur-GAN is a novel approach that has numerous real-world applications in areas such as crime scene investigation, border control, and forensic sciences.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
   obtaining a blurred image of a fingerprint;
   generating, using a guided-attention (GA) mechanism, an intermediate feature map of the blurred image, wherein the GA mechanism generates the intermediate feature map by:
      generating an attended feature map from an input feature map based upon a predicted attention map; and
      adding the input feature map to the attended feature map; and
   generating a deblurred image of the fingerprint based at least in part upon the intermediate feature map.

2. The method of claim 1, wherein the predicted attention map is generated from the input feature map using a convolutional layer and a Sigmoid function.

3. The method of claim 1, wherein generating the attended feature map comprises multiplying the input feature map with the predicted attention map.

4. The method of claim 3, wherein the attended feature map is normalized by a 2D batch normalization.

5. The method of claim 1, wherein the input feature map is generated from an intermediate feature map generated by a preceding GA mechanism.

6. The method of claim 5, wherein the input feature map is generated by up-sampling the intermediate feature map generated by the preceding GA mechanism.

7. The method of claim 1, wherein the deblurred image is generated from the intermediate feature map using a convolutional layer.

8. The method of claim 1, wherein the deblurred image is a deblurred output image of the fingerprint having a resolution equal to the blurred image of the fingerprint, the deblurred output image generated by:
   up-sampling the intermediate feature map; and
   applying a convolutional layer.

9. The method of claim 1, comprising identifying a blurring type associated with the blurred image based upon the intermediate feature map.

10. The method of claim 1, comprising generating a second intermediate feature map of the blurred image using a second GA mechanism, the second intermediate feature map having a resolution less than the intermediate feature map.

11. The method of claim 1, comprising determining a reconstruction loss based upon a comparison of the deblurred image and a corresponding ground truth image.

12. A system, comprising:
   processing circuitry comprising a processor and memory; and
   a fingerphoto deblurring application executable by the processing circuitry, where execution of the fingerphoto deblurring application causes the processing circuitry to:
      generate, using a guided-attention (GA) mechanism, an intermediate feature map of a blurred image of a fingerprint, wherein the GA mechanism generates the intermediate feature map by:
         generating an attended feature map from an input feature map based upon a predicted attention map; and
         adding the input feature map to the attended feature map; and
      generate a deblurred image of the fingerprint based at least in part upon the intermediate feature map.

13. The system of claim 12, wherein the predicted attention map is generated from the input feature map using a convolutional layer and a Sigmoid function.

14. The system of claim 12, wherein generating the attended feature map comprises multiplying the input feature map with the predicted attention map.

15. The system of claim 12, wherein the input feature map is generated from an intermediate feature map generated by a preceding GA mechanism.

16. The system of claim 12, wherein the deblurred image is generated from the intermediate feature map using a convolutional layer.

17. The system of claim 12, wherein the deblurred image is generated by:
   up-sampling the intermediate feature map; and
   applying a convolutional layer.

18. The system of claim 12, comprising execution of the fingerphoto deblurring application causes the processing circuitry to generate a second intermediate feature map of the blurred image using a second GA mechanism, the second intermediate feature map having a resolution less than the intermediate feature map.

* * * * *